United States Patent
Sejpal et al.

(10) Patent No.: US 10,289,600 B2
(45) Date of Patent: May 14, 2019

(54) REDUCING TRANSMITTER ENCODING JITTER IN A C-PHY INTERFACE USING MULTIPLE CLOCK PHASES TO LAUNCH SYMBOLS

(71) Applicant: QUALCOMM Incorporated, San Diego, CA (US)

(72) Inventors: Dhaval Sejpal, San Diego, CA (US); Shih-Wei Chou, San Diego, CA (US); Chulkyu Lee, San Diego, CA (US); Ohjoon Kwon, Irvine, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/332,756

(22) Filed: Oct. 24, 2016

(65) Prior Publication Data
US 2017/0039163 A1    Feb. 9, 2017

Related U.S. Application Data

(63) Continuation-in-part of application No. 15/041,901, filed on Feb. 11, 2016, now Pat. No. 9,842,073, which
(Continued)

(51) Int. Cl.
*G06F 13/20* (2006.01)
*G06F 13/42* (2006.01)
(Continued)

(52) U.S. Cl.
CPC ........ *G06F 13/4291* (2013.01); *H04L 7/0033* (2013.01); *H04L 25/4917* (2013.01); *G06F 13/4278* (2013.01)

(58) Field of Classification Search
CPC ............ G06F 13/4291; G06F 13/4278; H04L 7/0033; H04L 25/4917
See application file for complete search history.

(56) References Cited

U.S. PATENT DOCUMENTS

| 4,468,787 A | 8/1984 | Keiper, Jr. |
| 5,872,819 A | 2/1999 | Carsello et al. |
| (Continued) | | |

FOREIGN PATENT DOCUMENTS

| JP | 2002094489 A | 3/2002 |
| JP | 2005217999 A | 8/2005 |
| (Continued) | | |

OTHER PUBLICATIONS

International Search Report and Written Opinion—PCT/US2014/050108—ISA/EPO—dated Oct. 24, 2014.
(Continued)

*Primary Examiner* — Jing-Yih Shyu
(74) *Attorney, Agent, or Firm* — Loza & Loza LLP

(57) ABSTRACT

A method for error detection in transmissions on a multi-wire interface includes providing a plurality of launch clock signals, including launch clock signals having a different phase shifts, determining a type of transition in signaling state that will occur on each wire of the 3-wire interface at a boundary between two consecutively transmitted symbols, and selecting one of the plurality of launch clock signals to initiate the transition of signaling state on each wire of the 3-phase interface. Selecting one of the plurality of launch clock signals may include selecting a first launch clock signal when the transition in signaling state terminates at an undriven state, and selecting a second launch clock signal when the transition in signaling state begins at an undriven
(Continued)

state. An edge in the first launch clock signal may occur before a corresponding edge in the second launch clock signal.

20 Claims, 19 Drawing Sheets

Related U.S. Application Data is a continuation of application No. 14/453,346, filed on Aug. 6, 2014, now Pat. No. 9,276,731.

(60) Provisional application No. 61/863,695, filed on Aug. 8, 2013.

(51) Int. Cl.
*H04L 25/49* (2006.01)
*H04L 7/00* (2006.01)

(56) References Cited

U.S. PATENT DOCUMENTS

| | | | |
|---|---|---|---|
| 5,905,716 A | 5/1999 | Vidales | |
| 6,055,117 A | 4/2000 | Hansen et al. | |
| 7,093,145 B2 | 8/2006 | Werner et al. | |
| 7,190,284 B1 | 3/2007 | Dye et al. | |
| 7,308,048 B2 | 12/2007 | Wei | |
| 7,339,502 B2* | 3/2008 | Furtner | G06F 13/4295 341/55 |
| 7,412,016 B2 | 8/2008 | Stojanovic | |
| 7,443,319 B2 | 10/2008 | Schwartz et al. | |
| 7,535,957 B2 | 5/2009 | Ozawa et al. | |
| 7,961,832 B2 | 6/2011 | Scheffler | |
| 8,064,535 B2 | 11/2011 | Wiley et al. | |
| 8,121,186 B2 | 2/2012 | Chmelar et al. | |
| 8,305,244 B2 | 11/2012 | Said | |
| 8,310,964 B2 | 11/2012 | Grushkevich | |
| 8,472,551 B2 | 6/2013 | Wiley et al. | |
| 9,148,198 B1 | 9/2015 | Zhang et al. | |
| 9,276,731 B2 | 3/2016 | Lee et al. | |
| 9,485,080 B1 | 11/2016 | Duan et al. | |
| 2003/0039326 A1 | 2/2003 | Hall et al. | |
| 2004/0220736 A1 | 11/2004 | Wallace et al. | |
| 2005/0068082 A1* | 3/2005 | Nguyen | G06F 1/06 327/277 |
| 2005/0181304 A1 | 8/2005 | Araki et al. | |
| 2006/0181304 A1 | 8/2006 | Dreps et al. | |
| 2007/0273402 A1 | 11/2007 | Zethmayr | |
| 2009/0015304 A1 | 1/2009 | Yin et al. | |
| 2009/0122199 A1 | 5/2009 | Hamada et al. | |
| 2009/0225873 A1 | 9/2009 | Lee et al. | |
| 2009/0241006 A1 | 9/2009 | Liikanen et al. | |
| 2010/0223413 A1 | 9/2010 | Liu | |
| 2010/0253361 A1 | 10/2010 | Nakamura et al. | |
| 2011/0220862 A1 | 9/2011 | Arita et al. | |
| 2012/0250746 A1 | 10/2012 | Sonntag | |
| 2013/0266047 A1 | 10/2013 | Sudhakaran et al. | |
| 2014/0112401 A1 | 4/2014 | Wiley et al. | |
| 2014/0184857 A1* | 7/2014 | Stokes | H04N 5/217 348/241 |
| 2014/0241465 A1* | 8/2014 | Itoigawa | H04L 25/0272 375/316 |
| 2014/0270026 A1 | 9/2014 | Sengoku et al. | |
| 2015/0030112 A1 | 1/2015 | Wiley et al. | |
| 2016/0013926 A1* | 1/2016 | Kil | H04L 7/0091 370/517 |
| 2016/0119169 A1* | 4/2016 | Schober | H04L 27/0014 370/503 |
| 2016/0127159 A1 | 5/2016 | Koli et al. | |
| 2016/0162423 A1 | 6/2016 | Lee et al. | |
| 2016/0350258 A1 | 12/2016 | Mangano et al. | |
| 2017/0091141 A1 | 3/2017 | Lee et al. | |

FOREIGN PATENT DOCUMENTS

| | | |
|---|---|---|
| JP | 2007511118 A | 4/2007 |
| JP | 2007142860 A | 6/2007 |
| JP | 2009077099 A | 4/2009 |
| TW | 187820 B | 7/1992 |
| TW | 540208 B | 7/2003 |
| TW | 579628 B | 3/2004 |
| TW | 201220719 A | 5/2012 |
| WO | WO-2005029743 A2 | 3/2005 |
| WO | WO-2005041164 A1 | 5/2005 |
| WO | WO-2007125963 A1 | 11/2007 |
| WO | WO-08109478 | 9/2008 |
| WO | WO-2009111208 | 9/2009 |
| WO | WO-2015013254 A1 | 1/2015 |

OTHER PUBLICATIONS

Taiwan Search Report—TW103127143—TIPO—dated Jun. 17, 2016.
International Search Report and Written Opinion—PCT/US2017/057900—ISA/EPO—dated Jan. 22, 2018.
European Search Report—EP17191695—Search Authority—Munich—dated Apr. 26, 2018.
Taiwan Search Report—TW106113704—TIPO—dated Sep. 27, 2018.

* cited by examiner

REDUCING TRANSMITTER ENCODING JITTER IN A C-PHY INTERFACE USING MULTIPLE CLOCK PHASES TO LAUNCH SYMBOLS

CROSS-REFERENCE TO RELATED APPLICATIONS

This application is a continuation-in-part of U.S. patent application Ser. No. 15/041,901 filed Feb. 11, 2016, which issued as U.S. Pat. No. 9,842,073, and which was a continuation of U.S. patent application Ser. No. 14/453,346 filed Aug. 6, 2014, which issued as U.S. Pat. No. 9,276,731, and which claimed priority to and benefit of U.S. provisional patent application No. 61/863,695 filed Aug. 8, 2013, the entire content of which applications and patents being incorporated herein by reference.

TECHNICAL FIELD

The present disclosure relates generally to high-speed data communications interfaces, and more particularly, to reducing jitter in multi-wire, multi-phase data communication interfaces.

BACKGROUND

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to the Display System Interface (DSI) standard specified by the Mobile Industry Processor Interface Alliance (MIPI).

Higher frequency components of a high-speed signal traveling through a channel can be significantly attenuated due to channel bandwidth limitations and the degree of attenuation may correlate to the frequency of the signal. The losses of high frequency components can cause inter-symbol interference (ISI) and can increase jitter. A commonly-used compensation technique employs pre-emphasis at the transmitter, which may also be referred to as feed-forward equalization (FFE). FFE can be employed in single-ended and differential line drivers, but has limited effect on other types of drivers.

In one example, a three-wire interface (C-PHY) defined by MIPI uses a trio of conductors rather than differential pairs to transmit information between devices. Each of the three wires may be in one of three signaling states during transmission of a symbol over the C-PHY interface. Clock information is encoded in a sequence of symbols transmitted on the C-PHY link and a receiver generates a clock signal from transitions between consecutive symbols. In a C-PHY interface, the maximum speed of the communication link and the ability of a clock-data recovery (CDR) circuit to recover clock information may be limited by the maximum time variation related to transitions of signals transmitted on the different wires of the communication link.

Accordingly, there is an ongoing need to improve signaling capabilities of multi-wire interfaces.

SUMMARY

Certain aspects of the disclosure relate to systems, apparatus, methods and techniques that can reduce transmitter encoding jitter in a C-PHY interface using multiple clock phases to launch symbols.

According to certain aspects disclosed herein, a method of transmitting data on a multi-wire interface includes providing a plurality of launch clock signals, certain of the launch clock signals having a different phase-shift with respect to a symbol clock used to control symbol transmission on a 3-wire interface, determining a type of transition in signaling state that will occur on each wire of the 3-wire interface at a boundary between two consecutively transmitted symbols, and selecting one of the plurality of launch clock signals to initiate the transition of signaling state on each wire of the 3-phase interface. Selecting one of the plurality of launch clock signals may include selecting a first launch clock signal when the transition in signaling state terminates at an undriven state, and selecting a second launch clock signal when the transition in signaling state begins at an undriven state. An edge in the first launch clock signal may occur before a corresponding edge in the second launch clock signal. During each symbol transmission, a 3-phase signal may be transmitted on each wire of the 3-wire interface. The 3-phase signal transmitted on each wire may be out-of-phase with signals transmitted on each other wire of the 3-wire interface.

In one aspect, selecting one of the plurality of launch clock signals includes selecting a common launch clock signal for all wires of the 3-wire interface when less than all wires of the 3-wire interface transition at the boundary between the two consecutively transmitted symbols.

In some aspects, selecting one of the plurality of launch clock signals includes selecting a third launch clock signal when the transition in signaling state begins and ends at different driven states. An edge in the third launch clock signal may occur after a corresponding edge in the first launch clock signal and before a corresponding edge in the second launch clock signal. The first launch clock signal, the second launch clock signal, and the third launch clock signal may be selected to reduce differences between arrival times of signaling state transitions associated with the boundary between the two consecutively transmitted symbols at a receiver coupled to the 3-wire interface. The third launch clock may serve as the symbol clock.

In one aspect, a transition occurs on at least one wire of the 3-wire interface at each boundary between pairs of consecutively transmitted symbols.

In one example, the 3-wire interface complies or is compatible with a C-PHY interface defined by the MIPI Alliance.

According to certain aspects, a line driver adapted for driving one wire of a three-wire interface may include a clock generator, decision logic and a set of flip-flops. The clock generator may be configured to provide a plurality of launch clock signals, each launch clock signal having a different phase-shifts with respect to a symbol clock used to control symbol transmission on a 3-wire interface. The decision logic may be configured to determine a type of transition in signaling state that will occur on each wire at a boundary between two consecutively transmitted symbols, and to select one of the plurality of launch clock signals as a current launch signal to initiate the transition of signaling state. The set of flip-flops may be configured to receive the current launch signal and to control timing of launch of 3-phase signals on the 3-wire interface. During each symbol transmission, a 3-phase signal may be transmitted on each wire of the 3-wire interface, the 3-phase signal transmitted on each wire being out-of-phase with signals transmitted on each other wire of the 3-wire interface.

In one aspect, the decision logic is configured to select a first launch clock signal when the transition in signaling state terminates at an undriven state, and select a second launch clock signal when the transition in signaling state begins at an undriven state. In one example, an edge in the first launch clock signal occurs before a corresponding edge in the second launch clock signal.

In one aspect, the decision logic is configured to select a common launch clock signal for all wires of the 3-wire interface when less than all wires of the 3-wire interface transition at the boundary between the two consecutively transmitted symbols.

In some aspects, the decision logic is configured to select a third launch clock signal when the transition in signaling state begins and ends at different driven states. For example, an edge in the third launch clock signal may occur after a corresponding edge in the first launch clock signal and before a corresponding edge in the second launch clock signal. The first launch clock signal, the second launch clock signal, and the third launch clock signal may be selected to reduce differences between arrival times of signaling state transitions associated with the boundary between the two consecutively transmitted symbols at a receiver coupled to the 3-wire interface. The third launch clock may be the symbol clock.

In one aspect, a transition occurs on at least one wire of the 3-wire interface at each boundary between pairs of consecutively transmitted symbols. The 3-wire interface comply with or be compatible with a C-PHY interface defined by the Mobile Industry Processor Interface Alliance.

According to certain aspects an apparatus includes means for providing a plurality of launch clock signals, each launch clock signal having a different phase-shifts with respect to a symbol clock used to control symbol transmission on a 3-wire interface. During each symbol transmission, a 3-phase signal may be transmitted on each wire of the 3-wire interface, the 3-phase signal transmitted on each wire being out-of-phase with signals transmitted on each other wire of the 3-wire interface. The apparatus may include means for determining a type of transition in signaling state that will occur on each wire at a boundary between two consecutively transmitted symbols, and means for initiating the transition of signaling state using one of the plurality of launch clock signals. The means for initiating the transition of signaling state may be configured to use a first launch clock signal to initiate the transition of signaling state when the transition in signaling state terminates at an undriven state, and use a second launch clock signal to initiate the transition of signaling state when the transition in signaling state begins at an undriven state. An edge in the first launch clock signal may occur before a corresponding edge in the second launch clock signal.

In one aspect, the means for initiating the transition of signaling state is configured to use a common launch clock signal for initiating transitions of signaling state on all wires of the 3-wire interface when less than all wires of the 3-wire interface transition at the boundary between the two consecutively transmitted symbols.

In one aspect the means for initiating the transition of signaling state is configured to select a third launch clock signal to initiate the transition of signaling state when the transition in signaling state begins and ends at different driven states. An edge in the third launch clock signal may occur after a corresponding edge in the first launch clock signal and before a corresponding edge in the second launch clock signal.

In one aspect the first launch clock signal, the second launch clock signal, and the third launch clock signal are selected to reduce differences between arrival times of signaling state transitions associated with the boundary between the two consecutively transmitted symbols at a receiver coupled to the 3-wire interface. The third launch clock may be the symbol clock.

According to certain aspects, a computer readable storage medium has instructions stored thereon. The storage medium may include transitory or non-transitory storage media. The instructions may be executed by a processor such that the processor is caused to provide a plurality of launch clock signals, each launch clock signal having a different phase-shifts with respect to a symbol clock used to control symbol transmission on a 3-wire interface, determine a type of transition in signaling state that will occur on each wire of the 3-wire interface at a boundary between two consecutively transmitted symbols, and select one of the plurality of launch clock signals to initiate the transition of signaling state on each wire of the 3-phase interface. The storage medium may have instructions for selecting a first launch clock signal when the transition in signaling state terminates at an undriven state, and selecting a second launch clock signal when the transition in signaling state begins at an undriven state. An edge in the first launch clock signal may occur before a corresponding edge in the second launch clock signal. During each symbol transmission, a 3-phase signal is transmitted on each wire of the 3-wire interface, the 3-phase signal transmitted on each wire being out-of-phase with signals transmitted on each other wire of the 3-wire interface.

In one aspect, the storage medium may have instructions for selecting a common launch clock signal for all wires of the 3-wire interface when less than all wires of the 3-wire interface transition at the boundary between the two consecutively transmitted symbols.

In some aspect, the storage medium may have instructions for selecting a third launch clock signal when the transition in signaling state begins and ends at different driven states. An edge in the third launch clock signal may occur after a corresponding edge in the first launch clock signal and before a corresponding edge in the second launch clock signal. The first launch clock signal, the second launch clock signal, and the third launch clock signal may be selected to reduce differences between arrival times of signaling state transitions associated with the boundary between the two consecutively transmitted symbols at a receiver coupled to the 3-wire interface. The third launch clock may serve as the symbol clock.

In one aspect a transition occurs on at least one wire of the 3-wire interface at each boundary between pairs of consecutively transmitted symbols.

In one example, the 3-wire interface complies or is compatible with a C-PHY interface defined by the MIPI Alliance.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
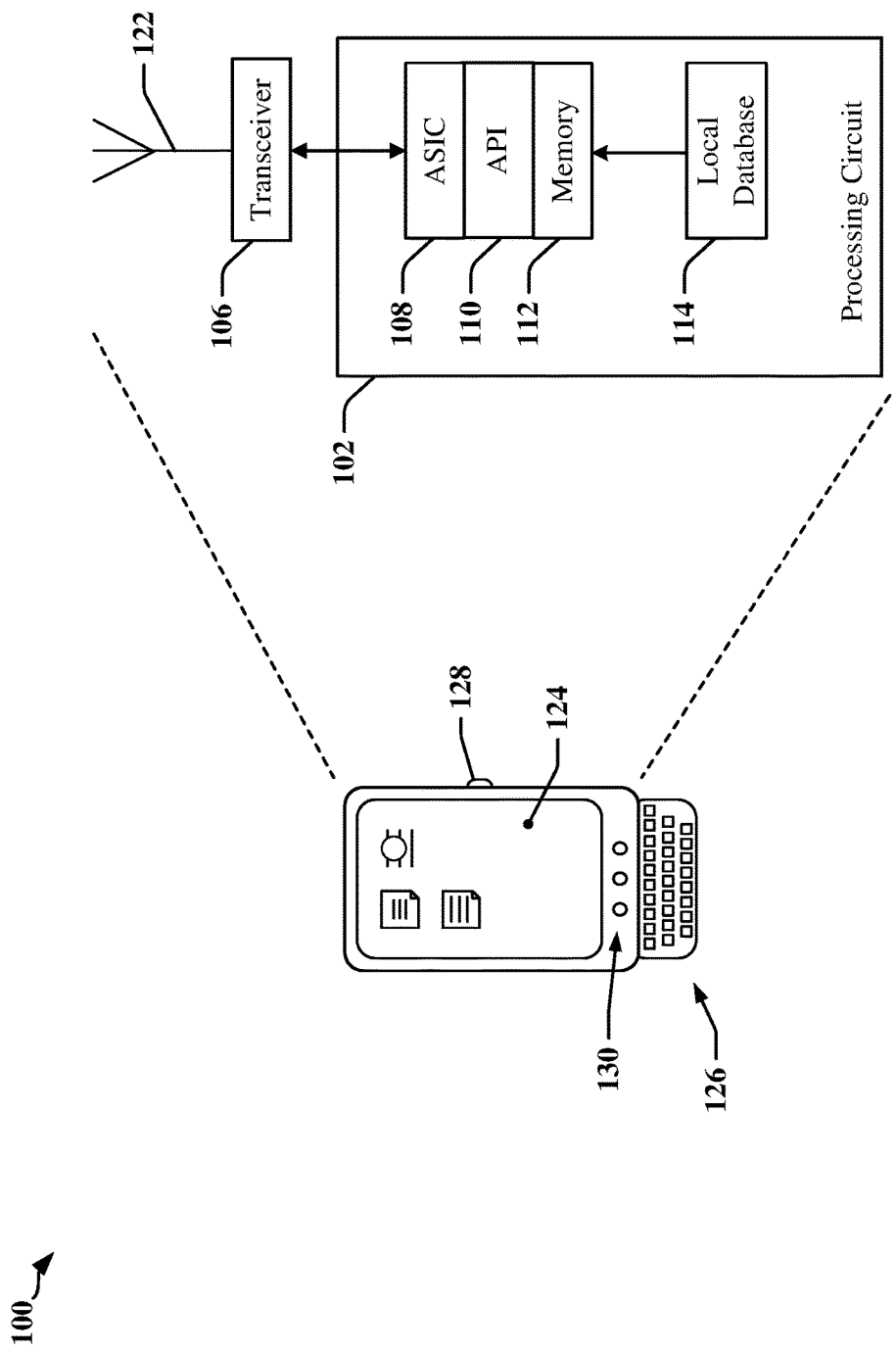
FIG. 1 depicts an apparatus employing a data link between integrated circuit (IC) devices that selectively operates according to one of plurality of available standards.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

Certain data transfer interfaces employ transition encoding, including the C-PHY 3-phase interface defined by the MIPI Alliance. Data is encoded in symbols, where each symbol controls signaling state of the C-PHY 3-phase interface in on symbol interval. Information used to generate a receive clock at the receiver is provided by ensuring that a change in signaling state of the interface occurs at each symbol boundary providing information used to generate a receive clock at the receiver.

The C-PHY interface is a high speed serial interface that provides high throughput over bandwidth limited channels. The C-PHY interface is used to connect application processors and peripherals, including displays and cameras. The C-PHY interface encodes data in symbols that define the signaling state of a three-wire trio. In each symbol interval, each wire in the three-wire trio carries a 3-phase signal that is 120° out-of-phase with the signal transmitted on the other two wires. An effective transfer of 2.28 bits per symbol may be achieved.

Within a three-wire trio, two of the three-wire trio are driven to opposite levels (high and low) while the third wire is terminated to a mid-level (common mode level), and the combination of voltages at which the wires are driven changes at every symbol. Thus, a C-PHY 3-Phase transmitter requires a driver to be able to drive a high, low or middle (common mode) voltage onto the transmit channel. As described herein, the signaling scheme in some transitions being full swing (example low-to-high, or high-to-low), and some transitions being half swing (example mid-level to low/high, and low/high to mid-level). This in turn can result different transition times and/or in different zero crossings in the transmitted differential signal pairs, and can create "encoding jitter," which may impact the signal integrity of a communication link.

According to certain aspects disclosed herein, signal integrity can be improved in a C-PHY interface by reducing transmitter encoding jitter using multiple clock phases to launch symbols. This time-based solution can improve sampling timing at the receiver. For each symbol to be transmitted, a transmitter launch clock is selected for each wire of the three-wire trio based on the type of transition in signaling state that will occur when the symbol is transmitted. The transmitter launch clock may be provided in multiple versions with different phase shifts.

Example of a Device that Includes a C-PHY Interface

FIG. 1 depicts an apparatus 100 that may employ a communication link between IC devices. In one example, the apparatus 100 may include a communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC 108). The ASIC 108 may include one or more processing devices, logic circuits, and so on. The processing circuit 102 may include and/or be coupled to processor-readable storage such as a memory device 112 that can store and maintain data and instructions for execution or other use by the processing circuit 102. The processing circuit 102 may be controlled by one or more of an operating system and an application programming interface (API) 110 layer that supports and enables execution of software modules residing in storage media, such as the memory device 112 of the device. The memory device 112 may include ROM or RAM, EEPROM, flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit 102 may also be operably coupled to external devices such as an antenna 122, a display 124, operator controls, such as a button 128 and a keypad 126 among other components 130.

Figure 2:
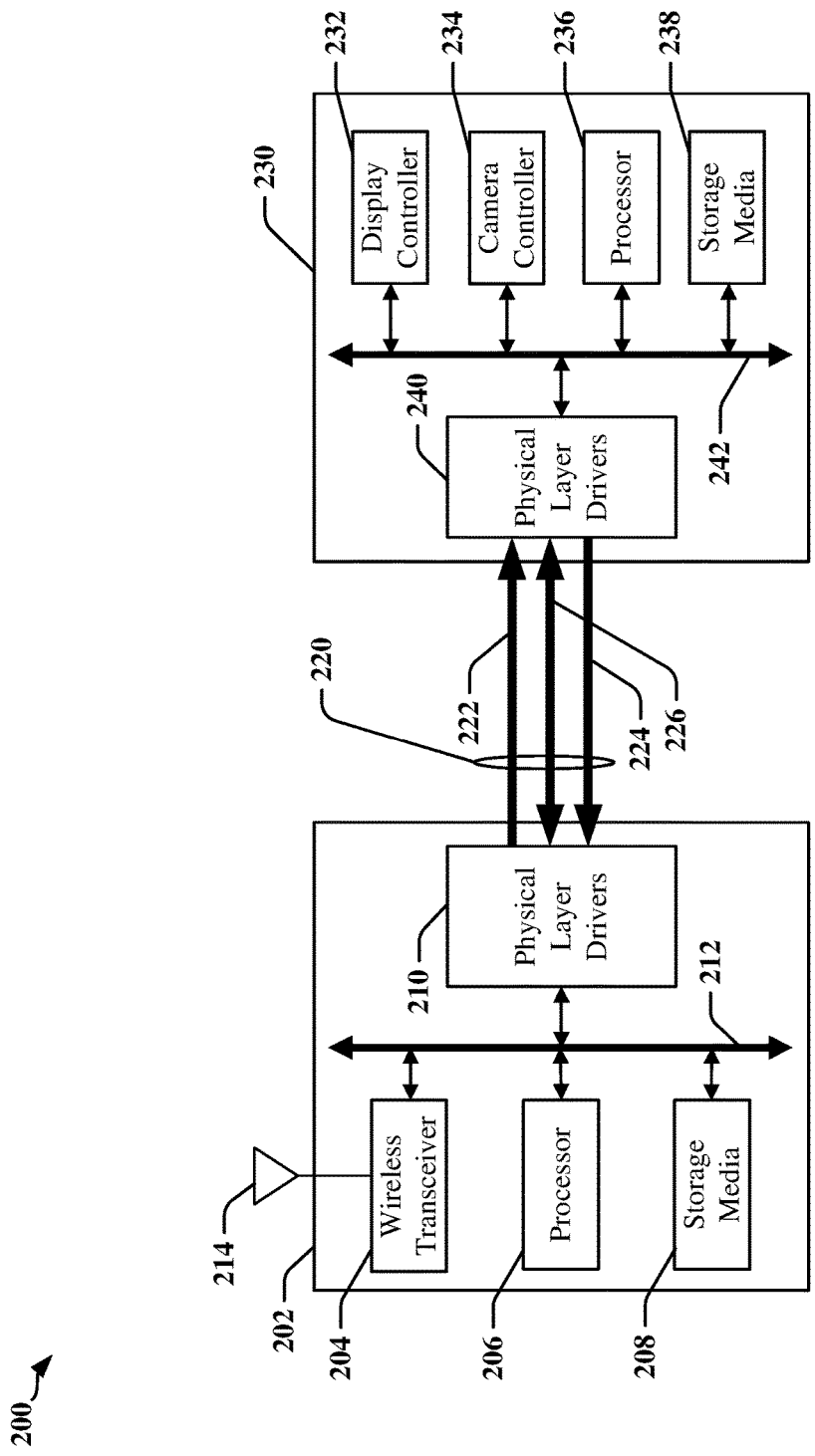
FIG. 2 illustrates a system architecture for an apparatus employing a data link between IC devices.

FIG. 2 is a block schematic diagram illustrating certain aspects of an apparatus 200 such as a mobile device that employs a communication link 220 to connect various subcomponents, IC devices or circuits. In one example, the apparatus 200 includes a plurality of IC devices 202 and 230 that exchange data and control information through the communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a mobile computing device while a second IC device 230 may be located in a display section of mobile computing device. In another example, a portion of the communication link 220 may include a cable or optical connection.

The communication link 220 may provide multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communications channel 222 may be referred to as a forward channel 222 while a second communications channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communications channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining communications through an RF transceiver 204 and an antenna 214, while the second IC device 230 may support a user interface that manages or operates a display controller 232. In the example, the second IC device 230 may be adapted to control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touchscreen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse channel 224 may be operated in the same manner as the forward channel 222, and the forward channel 222 and reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

In some instances, the forward and reverse channels 222 and 224 may be configured or adapted to support a wide video graphics array (WVGA) 80 frames per second LCD driver IC without a frame buffer, delivering pixel data at 810 Mbps for display refresh. In another example, the forward and reverse channels 222 and 224 may be configured or adapted to enable communications between with dynamic random access memory (DRAM), such as double data rate synchronous dynamic random access memory (SDRAM). The drivers 210, 240 may include encoding devices that can be configured to encode multiple bits per clock transition, and multiple sets of wires can be used to transmit and receive data from the SDRAM, control signals, address signals, and other signals.

The forward and reverse channels 222 and 224 may comply with, or be compatible with application-specific industry standards. In one example, the MIPI Alliance defines physical layer interfaces between an application processor IC device 202 and an IC device 230 that supports cameras and displays that may be provided in a mobile device. The MIPI Alliance defines specifications that govern the operational characteristics of products that comply with the MIPI Alliance specifications for mobile devices.

The MIPI Alliance defines standards and specifications that may address communication affecting all aspects of operations in a mobile device, including the antenna, peripherals, the modem and application processors. For example, the MIPI Alliance defines protocols for a camera serial interface (CSI) and a display serial interface (DSI). The MIPI Alliance CSI-2 defines a wired interface between a camera and Application Processor and the MIPI DSI or DSI-2 defines a wired interface between an Application Processor and a display. In one example, the low-level physical layer (PHY) interface in each of these applications may comply with or be compatible with MIPI Alliance C-PHY protocols.

The MIPI Alliance C-PHY Interface

According to certain aspects disclosed herein, systems and apparatus may employ multi-phase data encoding and decoding interface methods for communicating between the IC devices 202 and 230 within an apparatus 200. A multi-phase encoder may drive a plurality of conductors (i.e., M conductors). The M conductors typically include three or more conductors, and each conductor may be referred to as a wire, although the M conductors may include conductive traces on a circuit board or within a conductive layer of a semiconductor IC device. In one example, the MIPI Alliance-defined "C-PHY" physical layer interface technology may be used to connect camera and display devices 230 to an application processor device 202. The C-PHY interface employs three-phase symbol encoding to transmit data symbols on 3-wire lanes, or "trios" where each trio includes an embedded clock.

In some implementations, M conductors may be divided into a plurality of transmission groups, each group including a trio used to carry a portion of a block of data to be transmitted. The C-PHY interface employs a 3-phase encoding scheme in which bits of data are encoded in phase transitions and polarity changes on a trio. Decoding does not rely on independent conductors or pairs of conductors and timing information can be derived directly from phase and/or polarity transitions in the trio.

In a C-PHY interface, a three-phase encoding scheme for a three-wire system may define three phase states and two polarities, providing 6 states and 5 possible transitions from each state. Deterministic voltage and/or current changes may be detected and decoded to extract data from the three wires.

The communication link 220 may be implemented in a wired bus having a plurality of signal wires, which may be configured to carry three-phase encoded data in a high-speed digital interface, such as a mobile display digital interface (MDDI). One or more of the channels 222, 224 and 226 may be configured or adapted to use three-phase polarity encoding. The physical layer drivers 210 and 240 may be adapted to encode and decode three-phase polarity encoded data transmitted on link 220. The use of 3-phase polarity encoding provides for high-speed data transfer and may consume half or less of the power of other interfaces because fewer than 3 drivers are active in 3-phase polarity encoded data links 220 at any time. 3-phase polarity encoding circuits in the physical layer drivers 210 and/or 240 can encode multiple bits per transition on the communications link 220. In one example, a combination of three-phase encoding and polarity encoding may be used to support a wide video graphics array (WVGA), 80 frames per second LCD driver IC without a frame buffer, delivering pixel data for display refresh at 810 Mbps over three or more wires.

Figure 3:
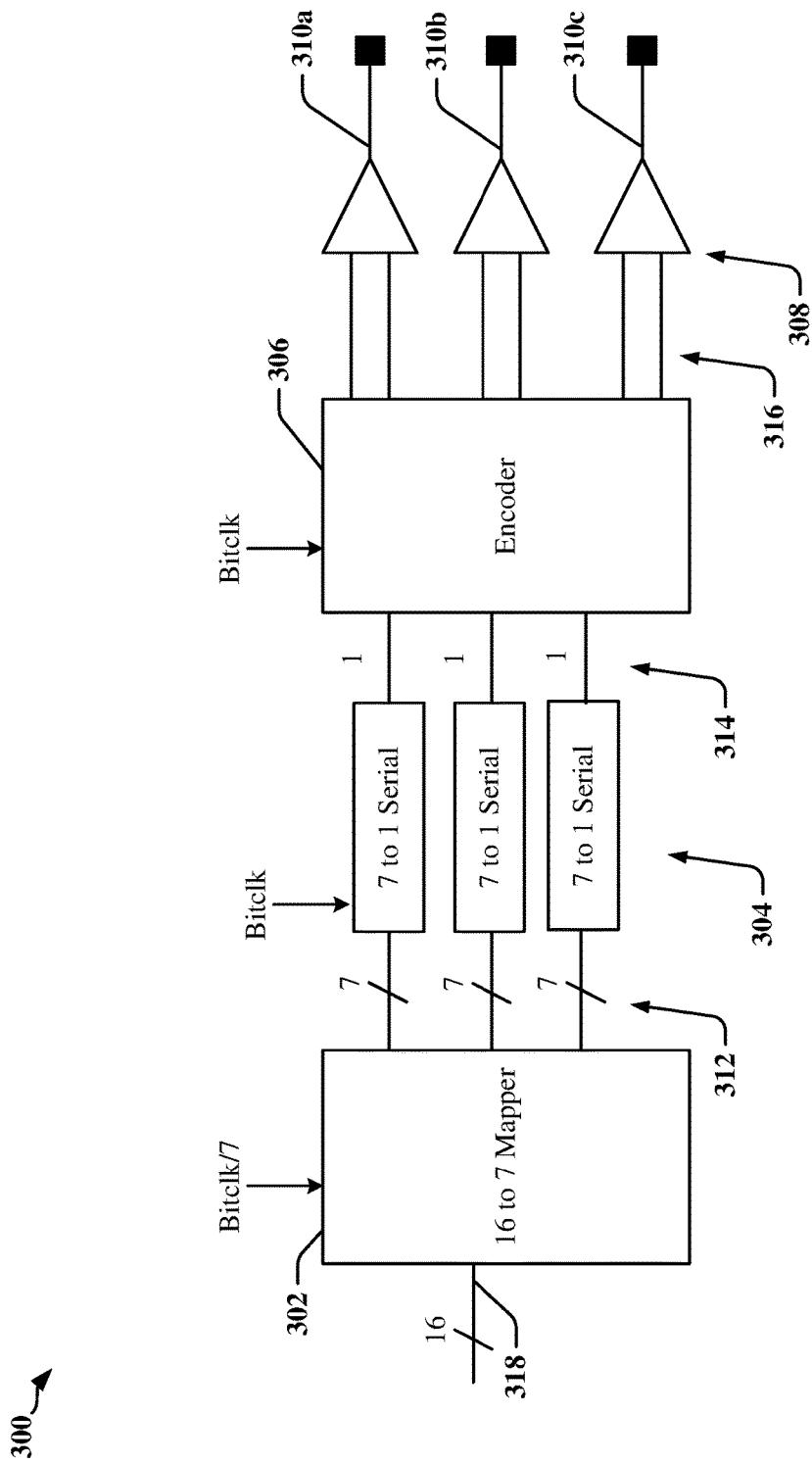
FIG. 3 illustrates an example of a transmitter in a C-PHY interface.

FIG. 3 is a block diagram illustrating the use of 3-phase polarity encoding by a transmitter 300 to implement certain aspects of the communication link 220 depicted in FIG. 2. The illustrated example may relate to a three-wire link or to a portion of a link that has more than three wires. In the depicted example transmitter 300, an M-wire, N-phase polarity encoding transmitter is configured for M=3 and N=3. The principles and techniques disclosed for three-wire, three-phase encoders can be applied in other configurations of M-wire, N-phase polarity encoders, and may comply or be compatible with other interface standards.

When 3-phase polarity encoding is used, connectors such as wires 310a, 310b and 310c on a 3-wire bus may be undriven, driven positive, or driven negative. An undriven wire 310a, 310b or 310c may be in a high-impedance state. An undriven wire 310a, 310b or 310c may be driven or pulled to a voltage level that lies substantially halfway between the positive and negative voltage levels provided on driven signal wires. An undriven wire 310a, 310b or 310c may have no current flowing through it. In the example transmitter 300, each wire 310a, 310b and 310c may be in one of three states (denoted as +1, −1, or 0) using drivers 308. In one example, drivers 308 may include unit-level current-mode drivers. In another example, drivers 308 may drive opposite polarity voltages on two signals transmitted on the wires 310a and 310b while the third wire 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one wire 310a, 310b or 310c is changed from the symbol transmitted in the preceding transmission interval.

A mapper 302 may map 16-bit input data 318 to a set of 7 symbols 312 used to control signaling state of the wires 310a, 310b, 310c when transmitted sequentially. A 3-wire, 3-phase encoder 306 selects the states of the wires 310a, 310b and 310c based on the input symbol 314 and the previous states of wires 310a, 310b and 310c. In one example, the 3-phase encoder 306 receives the set of 7 symbols 312 one symbol 314 at a time and computes the state of each wire 310a, 310b and 310c for each symbol interval, based on the immediately preceding state of the wires 310a, 310b, 310c. In another example, the set of 7 symbols 312 may be serialized using parallel-to-serial converters 304.

The use of 3-wire, 3-phase encoding permits a number of bits to be encoded in a plurality of symbols where the bits per symbol is not an integer. For a 3-wire, 3-phase implementation, there are 3 available combinations in which 2 wires are driven simultaneously and one wire is undriven. Two possible combinations of polarity are available for the pair of wires that is driven simultaneously, yielding 6 possible states. Since each transition occurs from a current state, 5 of the 6 states are available at every transition. The state of at least one wire is typically required to change at each transition. With 5 states, $\log_2(5)=2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
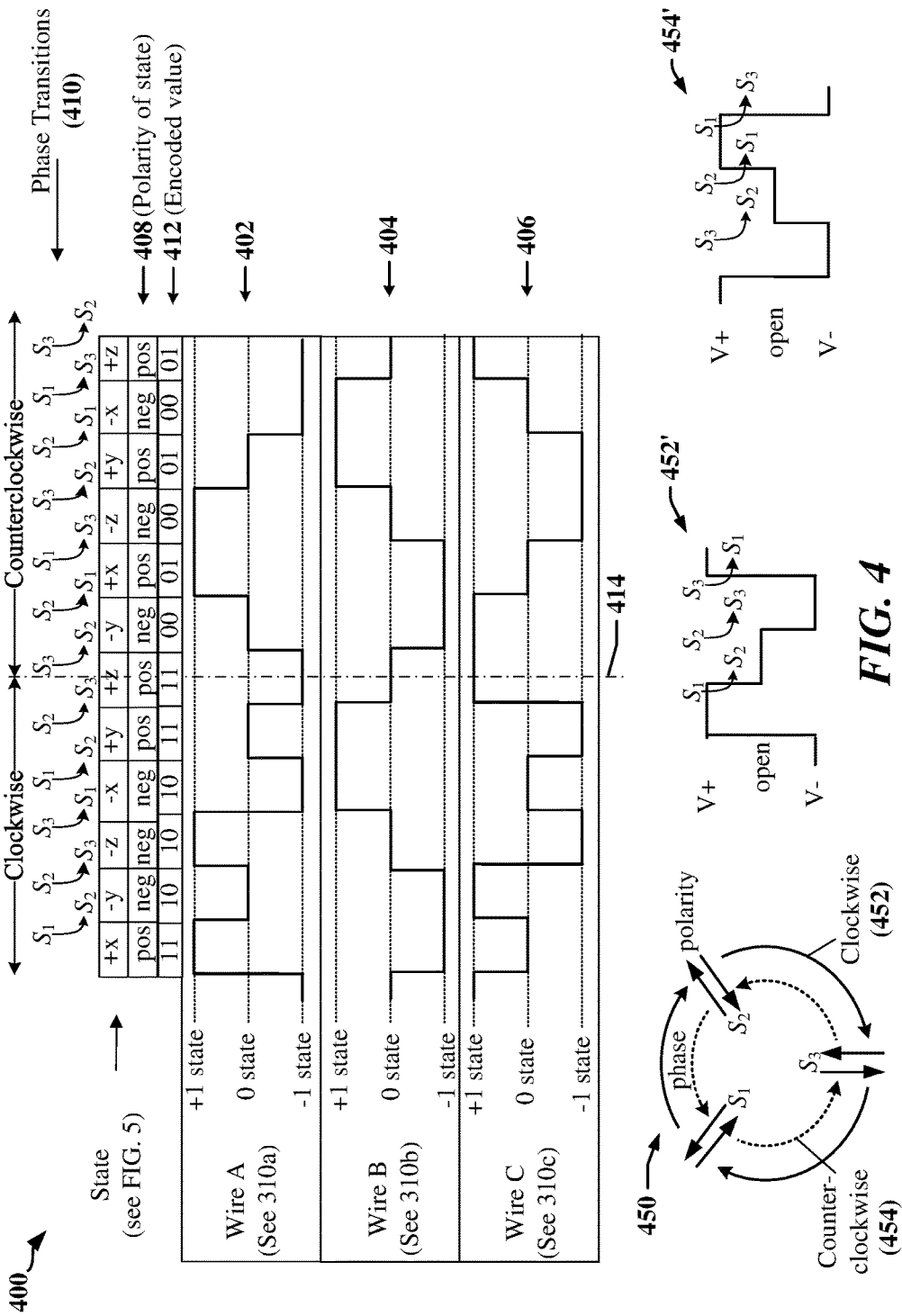
FIG. 4 illustrates signaling in an example of a C-PHY interface.

FIG. 4 illustrates an example of signaling 400 employing a three-phase modulation data-encoding scheme based on the circular state transition diagram 450. According to the data-encoding scheme, a three-phase signal may rotate in two directions and may be transmitted on three wires 310a, 310b and 310c. Each of three phase rotated versions of the three-phase signal is independently driven on one of the wires 310a, 310b, 310c. Each of the three versions of the three-phase signal is 120 degrees out of phase relative to the other two versions of the three-phase signal. At any point in time, the three wires 310a, 310b, 310c are in different signaling states {+1, 0, −1}, such that each wire 310a, 310b, 310c is in a different state than the other two wires 310a, 310b and 310c. The illustrated encoding scheme also provides for encoding information in the polarity of the two wires 310a, 310b and/or 310c that are actively driven to the +1 and −1 states. Polarity is indicated at 408 for the sequence of states depicted.

At any phase state in a C-PHY interface, exactly two of the wires 310a, 310b, 310c carry a signal which is effectively a differential signal for that phase state, while the third wire 310a, 310b or 310c is undriven. The phase state for each wire 310a, 310b, 310c may be determined by voltage difference between the wire 310a, 310b or 310c and at least one other wire 310a, 310b and/or 310c, or by the direction of current flow, or lack of current flow, in the wire 310a, 310b or 310c. As shown in the state transition diagram 450, three phase states ($S_1$, $S_2$ and $S_3$) are defined. A signal may flow clockwise 452 from phase state $S_1$ to phase state $S_2$, phase state $S_2$ to phase state $S_3$, and/or phase state $S_3$ to phase state $S_1$ and the signal may flow counter-clockwise 454 from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In a 3-phase interface, clockwise rotations ($S_1$ to $S_2$), ($S_2$ to $S_3$), and/or ($S_3$ to $S_1$) at a state transition 410 may be used to encode a logic 1, while counter-clockwise rotations ($S_1$ to $S_3$), ($S_3$ to $S_2$), and/or ($S_2$ to $S_1$) at the state transition 410 may be used to encode a logic 0. Accordingly, a bit may be encoded at each transition by controlling whether the signal is "rotating" clockwise or counter-clockwise. For example, a logic 1 may be encoded when the three wires 310*a*, 310*b*, 310*c* transition from phase state $S_1$ to phase state $S_2$ and a logic 0 may be encoded when the three wires 310*a*, 310*b*, 310*c* transition from phase state $S_1$ to phase state $S_3$. In the simple three-wire example depicted, direction of rotation may be easily determined based on which of the three wires 310*a*, 310*b*, 310*c* is undriven before and after the transition.

Information may also be encoded in the polarity and/or changes of polarity of state 408 of the driven wires 310*a*, 310*b*, 310*c*, or in the direction of current flow or changes in the direction of current flow between two wires 310*a*, 310*b*, 310*c*. Signals 402, 404, and 406 illustrate voltage levels applied to wires 310*a*, 310*b*, 310*c*, respectively at each phase state in a three-wire, three-phase link. At any time, a first wire 310*a*, 310*b*, 310*c* is coupled to a more positive voltage (+V, for example), a second wire 310*a*, 310*b*, 310*c* is coupled to a more negative voltage (−V, for example), while the third wire 310*a*, 310*b*, 310*c* may be open-circuited. As such, one polarity encoding state may be determined by the current flow between the first and second wires 310*a*, 310*b*, 310*c* or the voltage polarities of the first and second wires 310*a*, 310*b*, 310*c*. In some embodiments, two bits of data 412 may be encoded in each state transition 410. A decoder may determine the direction of signal phase rotation to obtain the first bit. The second bit may be determined based on the polarity difference between two of the signals 402, 404 and 406. In some instances, the second bit may be determined based on a change or lack of change in polarity of the differential signal transmitted on a pair of the wires 310*a*, 310*b*, 310*c*. The decoder having determined direction of rotation can determine the phase state and the polarity of the voltage applied between the two active wires 310*a*, 310*b* and/or 310*c*, or the direction of current flow through the two active wires 310*a*, 310*b* and/or 310*c*.

In a 3-phase interface, one bit of data may be encoded in the rotation, or phase change in the three-wire, three-phase link, and an additional bit may be encoded in the polarity or changes in polarity of two driven wires. Certain embodiments, encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5)=2.32$ bits per symbol (transition) and the mapper may accept a 16-bit word and convert it to 7 symbols. In other words, a three-wire, three-phase C-PHY link may map 16 bits of input data 318 to seven symbols 312.

Figure 5:
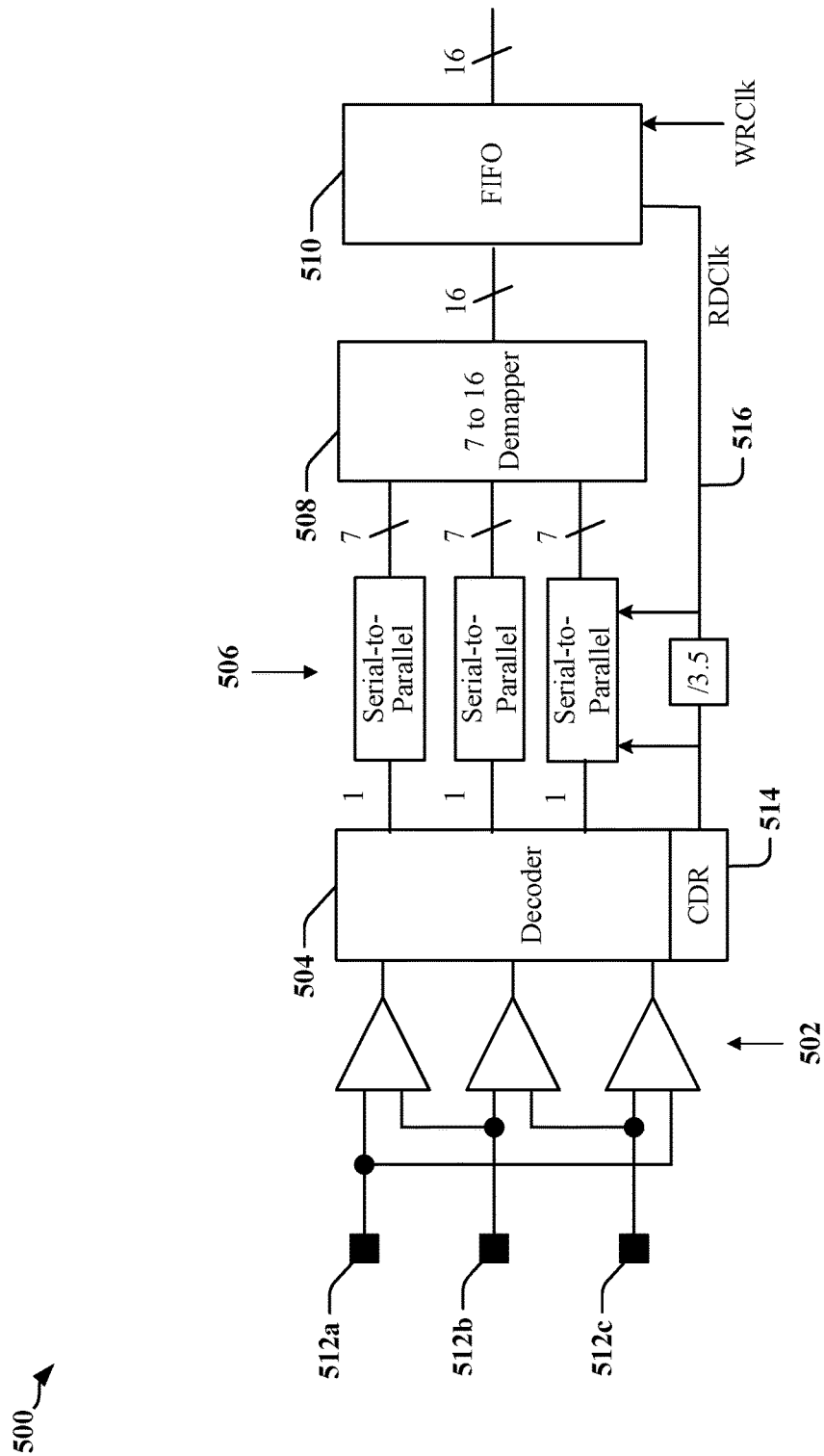
FIG. 5 illustrates certain aspects of a receiver in a C-PHY interface.

FIG. 5 illustrates an example of a receiver 500 in a 3-wire, 3-phase PHY. Comparators 502 and a decoder 504 are configured to provide a digital representation of the state of each of three transmission lines 512*a*, 512*b* and 512*c*, as well as the change in the state of the three transmission lines compared to the state transmitted in the previous symbol period. Seven consecutive states are assembled by serial-to-parallel convertors 506 to produce a set of 7 symbols to be processed by demapper 508 to obtain 16 bits of data that may be buffered in a first-in-first-out (FIFO) storage device 510, which may be implemented using registers, for example.

With reference again to FIGS. 2 and 3, the communication link 220 may include a high-speed digital interface that can be configured to support both differential encoding scheme and 3-phase polarity encoding. Physical layer drivers 210 and 240 may include 3-phase polarity encoders and decoders, which can encode multiple bits per transition on the interface, and line drivers to drive wires 310*a*, 310*b* and 310*c*. The line drivers may be constructed with amplifiers that produce an active output that can have a positive or negative voltage, or a high impedance output whereby a wires 310*a*, 310*b* or 310*c* is in an undefined state or a state that is defined by external electrical components. Accordingly, the output drivers 308 may receive by a pair of signals 316 that includes data and output control (high-impedance mode control), enabling the three-state amplifiers to be used for 3-phase polarity encoding.

System Architecture for a C-PHY Transceiver

Figure 6:
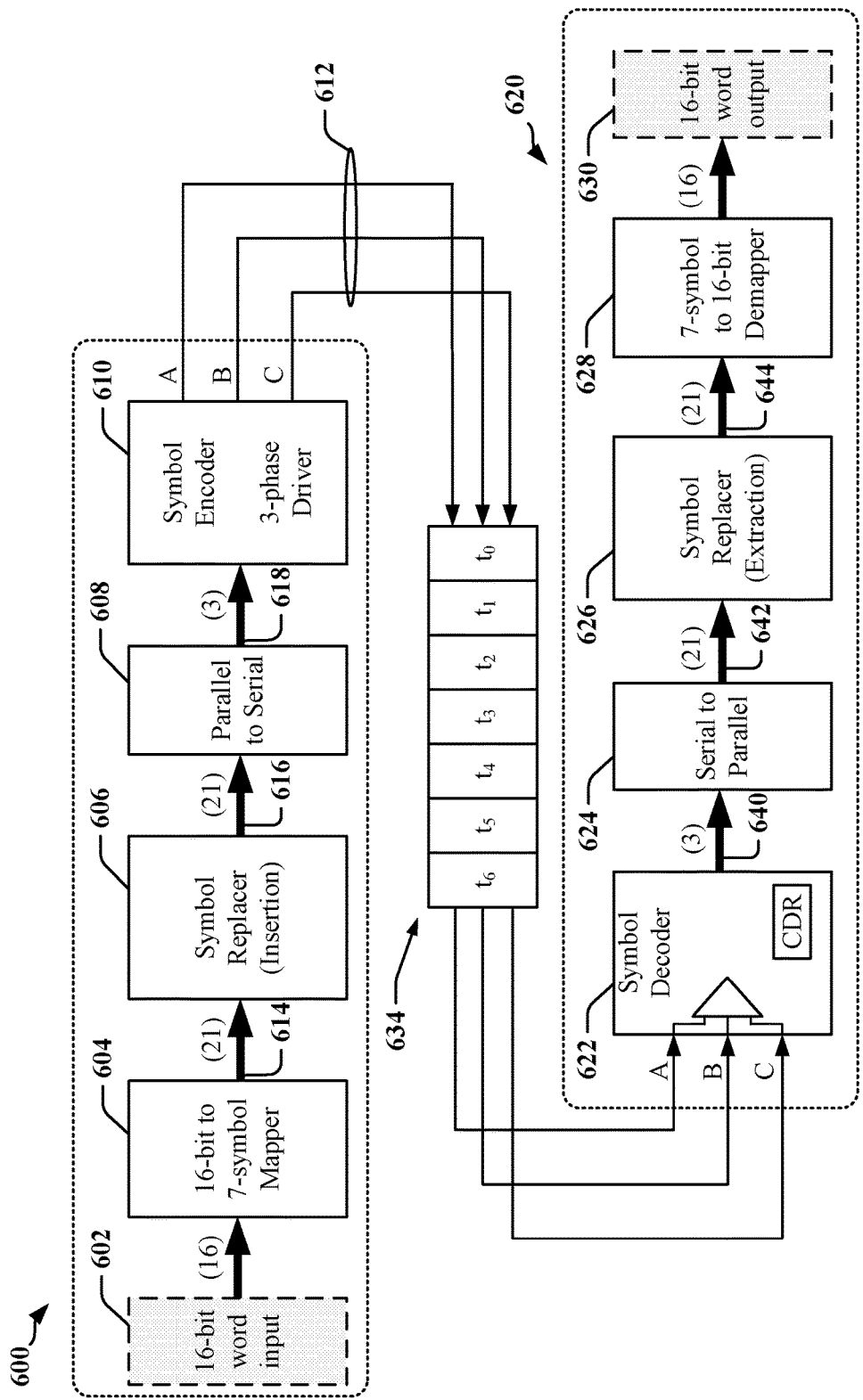
FIG. 6 illustrates an example of a C-PHY interface adapted for symbol and/or symbol sequence insertion according to certain aspects disclosed herein.

FIG. 6 is a diagram illustrating an example of a transmitter 600 and a receiver 620 that can be coupled to a C-PHY interface.

At the transmitter 600, 16-bit words 602 are received as the input to the mapper 604. The mapper 604 converts each of the 16-bit words 602 to seven symbols in a set of symbols 614 to be transmitted sequentially over the 3-wire link 612. The set of symbols 614 may be provided as a group of 21 bits organized as seven 3-bit symbols. The set of symbols 614 may be provided to a symbol insertion module 606 that may, for example, be configured insert Sync symbols or other control symbols, and/or to limit run-length by selectively substituting certain sets of symbols 614 received from the mapper 604 with a replacement set of symbols 632. This symbol insertion module 606 provides a selectively modified group of bits 616 to a parallel-to-serial converter 608 that produces a time-sequence of 3-bit symbols 618 to a symbol encoder 610, which defines the state of the three wires (labeled A, B and C) in the 3-wire link 612 in each of a sequence of symbol transmission intervals 634.

In a C-PHY interface, up to 12,589 sequences of symbols may be unused by the mapper 604 and these unused can be available to the symbol insertion module 606 for substitutions and insertions. The unused sequences of symbols are available because the mapper 604 maps 65,536 possible values of 16 bit words 602 to a 65,536 of the 78,125 possible permutations of sequences of phase and polarity for the three wires. Some of these unused sequences of symbols may be reserved for command and control purposes, synchronization sequences, and other purposes.

At the receiver 620, a symbol decoder 622 may include a set of differential receivers 636 and a CDR 638, which may cooperate to produce a receiver clock and decode a sequence of seven raw 3-bit symbols 640 based on the signaling states and transitions in signaling state of the three wires in the 3-wire link 612 during the sequence of symbol transmission intervals 634. The receiver 620 may include a serial-to-parallel convertor 624 that converts the sequence of seven raw symbols 640 to a group of 21 bits 642 organized as seven 3-bit symbols. A symbol extraction module 626 may be adapted or configured to receive the set of 21 bits 642 and to produce a modified set of 21 bits 644 after reversing symbol substitutions that may have been performed by the symbol insertion module 606 in the transmitter 600. The symbol extraction module 626 may be configured to identify sequences of symbols in the 12,589 sequences of symbols that are not used by the mapper 604, and to perform a predefined extraction or substitution as needed. The demapper 628 may convert the 7 symbols in the modified set of 21 bits 644 to a 16-bit word 630, which may be provided as an output of the receiver 620. Each symbol detected by the receiver 620 can be represented using a 3-bit raw symbol value, having one of five possible values: 000, 001, 010, 011 and 100. The value of the raw symbol value is defined by: {Same_Phase, delta_Phase, delta_Polarity}. Each of the three bits represents a change or no change from the previous wire state to the present wire state.

The symbol insertion module 606 and symbol extraction module 626 may be incorporated in the mapper 604 and demapper 628, respectively, and/or may be provided as distinct components. The symbol insertion module 606 in the transmitter 600 may be employed to perform a variety of substitutions or insertions using surplus symbols.

Signal Transitions in a C-PHY Interface

Figure 7:
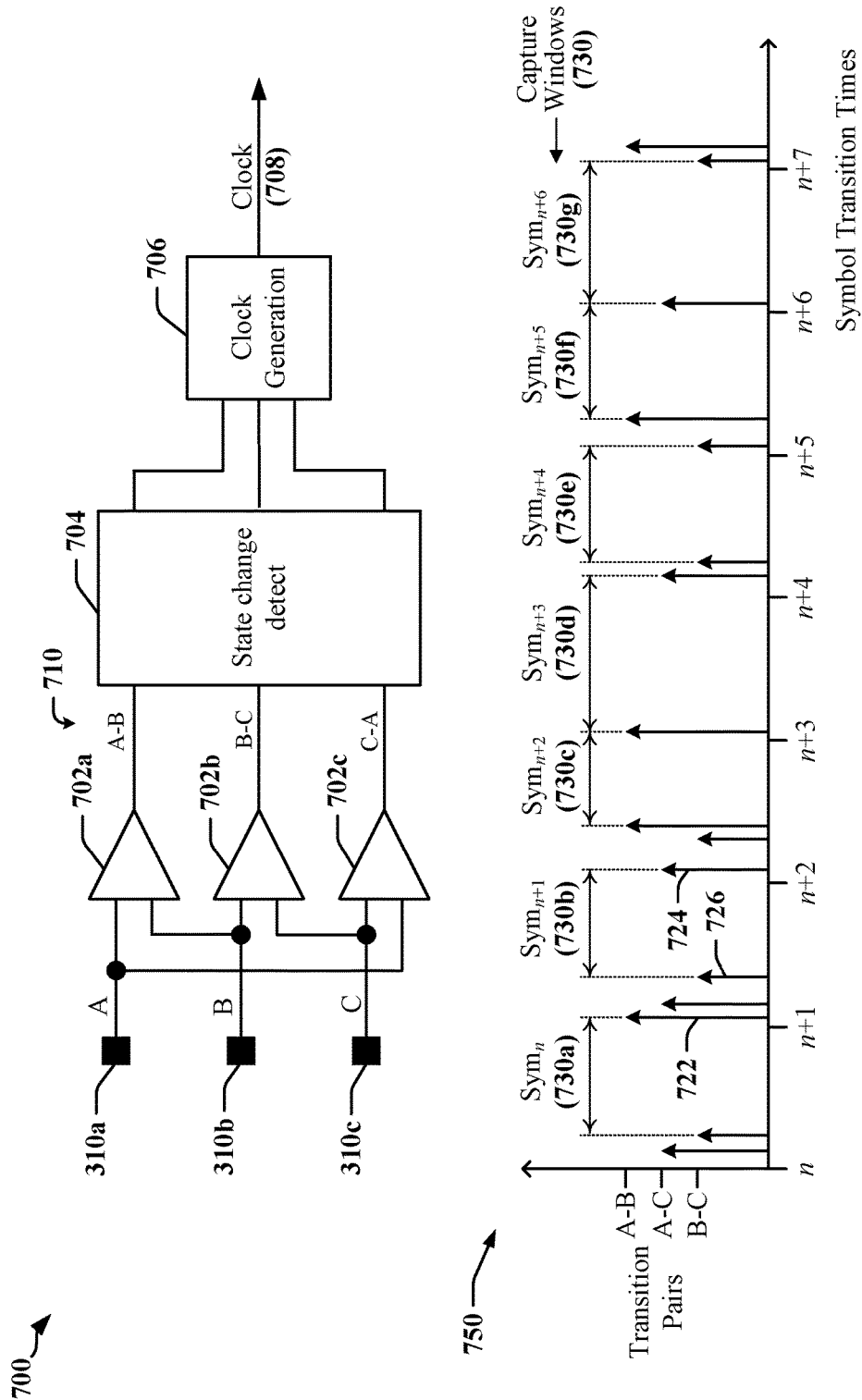
FIG. 7 illustrates transition detection in an M-wire N-phase polarity decoder.

FIG. 7 is a diagram 700 illustrating certain aspects of transition encoding and clock generation in a 3-wire, 3-phase decoder. A set of differential receivers 702a, 702b and 702c compares the signaling state of each of the three wires 310a, 310b and 310c with the signaling states of the other of the three wires 310a, 310b and 310c. In the example depicted, a first differential receiver 702a compares the signaling states of wires 310a and 310b and produces an A–B output, a second differential receiver 702b compares the states of wires 310b and 310c and produces a B–C output, and a third differential receiver 702c compares the states of wires 310a and 310c and produces a C–A output. As described herein, signaling state of at least one of the wires 310a, 310b and 310c changes at each symbol boundary. Accordingly, a state change detection circuit 704 can detect the occurrence of a change in signaling state when the output of at least one of the differential receivers 702a, 702b and 702c changes at the end of each symbol interval.

Certain signaling state transitions may be detectable by a single differential receiver 702a, 702b or 702c, while other signaling state transitions may be detected by two or more of the differential receivers 702a, 702b and/or 702c. In one example, the signaling states or relative states of two wires may be unchanged after a symbol transition, and the output of a corresponding differential receiver 702a, 702b or 702c may also be unchanged after the symbol transition. In another example, both wires in a pair of wires 310a, 310b and/or 310c may be in the same first state in a first time interval and both wires may be in a same second state in a second time interval, such that the output of a corresponding differential receiver 702a, 702b or 702c may be unchanged after the phase transition. Accordingly, a clock generation circuit 706 may include signaling state change detect circuit 704 that monitor the outputs of all differential receivers 702a, 702b and 702c in order to determine when a signaling state transition has occurred. The clock generation circuit may generate a receive clock signal 708 based on detected signaling state transitions.

Changes in signaling states on different wires 310a, 310b and/or 310c may occur or be detected at different times. The timing of detection of the signaling state changes may vary according to the type of signaling state change that has occurred. The result of this variability is illustrated in the timing diagram 750 provided in FIG. 7. Markers 722, 724 and 726 representing the outputs of the signaling state change detection circuit 704 and/or differential receivers 702a, 702b and 702c are assigned different heights for clarity of illustration only. The relative heights of markers 722, 724 and 726 have no specific relationship to voltage or current levels, polarity or weighting values used for clock generation or data decoding. The timing diagram 750 illustrates the effect of timing of transitions associated with symbols transmitted on the three wires 310a, 310b and 310c. In the timing diagram 750, transitions between some symbols may result in variable capture windows 730a, 730b, 730c, 730d, 730e, 730f and/or 730g (collectively, the symbol capture windows 730) during which symbols may be reliably captured. The number of signaling state changes detected and their relative timing can result in jitter on the clock signal 708.

Figure 8:
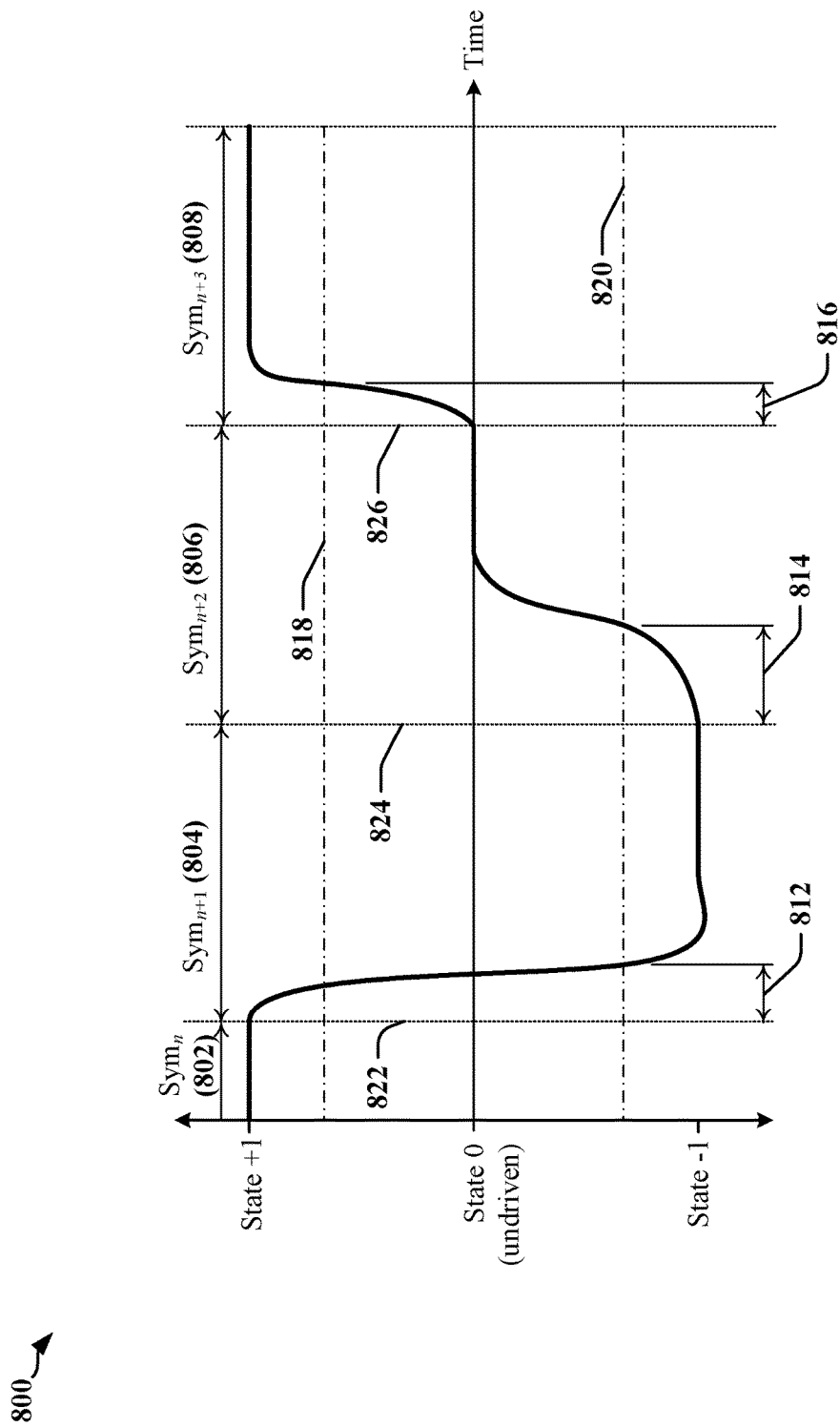
FIG. 8 illustrates certain effects of signal rise times on transition detection in an M-wire N-phase polarity decoder.

Variability in the sizes of the symbol windows 730, and associated jitter, may be caused in part by the electrical characteristics of the wires 310a, 310b and 310c, as illustrated in the simple example 800 depicted in FIG. 8. Transition times may be affected by variability in signal rise or fall times and/or variability in detection circuits caused by manufacturing process, voltage and temperature (PVT) variations related to the stability or instability of voltage and current sources and operating temperature, for example. Large variability in transition times may be attributable to the existence of different voltage or current levels in 3-phase signaling. A "voltage-level" example is depicted in FIG. 8, which illustrates transition times in a single wire 310a, 310b or 310c. A first symbol ($Sym_n$) 802 may be transmitted in a symbol interval that ends at time 822, a second symbol ($Sym_{n+1}$) 804 may be transmitted in a symbol interval that ends at time 824 and a third symbol ($Sym_{n+2}$) 806 may be transmitted in a symbol interval that ends at time 826, when transmission of a fourth symbol ($Sym_{n+3}$) 808 begins. The transition from a state determined by the first symbol 802 to the state corresponding to the second symbol 804 may be detected after a first delay 812 attributable to the time taken for voltage in the wire 310a, 310b or 310c to reach a threshold voltage 818 and/or 820. The threshold voltages may be used to determine the state of the wire 310a, 310b or 310c. The transition from a state determined by the second symbol 804 to the state for the third symbol 806 may be detected after a second delay 814 attributable to the time taken for voltage in the wire 310a, 310b or 310c to reach one of the threshold voltages 818 and/or 820. The transition from a state determined by the third symbol 806 to the state for the fourth symbol 808 may be detected after a third delay 816 attributable to the time taken for voltage in the wire 310a, 310b or 310c to reach a threshold voltage 818 and/or 820.

As depicted, the third delay 816 may be shorter than the first delay 812, and the second delay 814 may be the longest delay. The second delay 814 may be the longest delay because state 0 is an undriven state and the voltage in the wire 310a, 310b or 310c may drift slowly towards the threshold 820, whereas the first delay 812 and the third delay 816 are associated with transitions in which the wire 310a, 310b or 310c is actively pulled to the −1 and +1 states, respectively.

Figure 9:
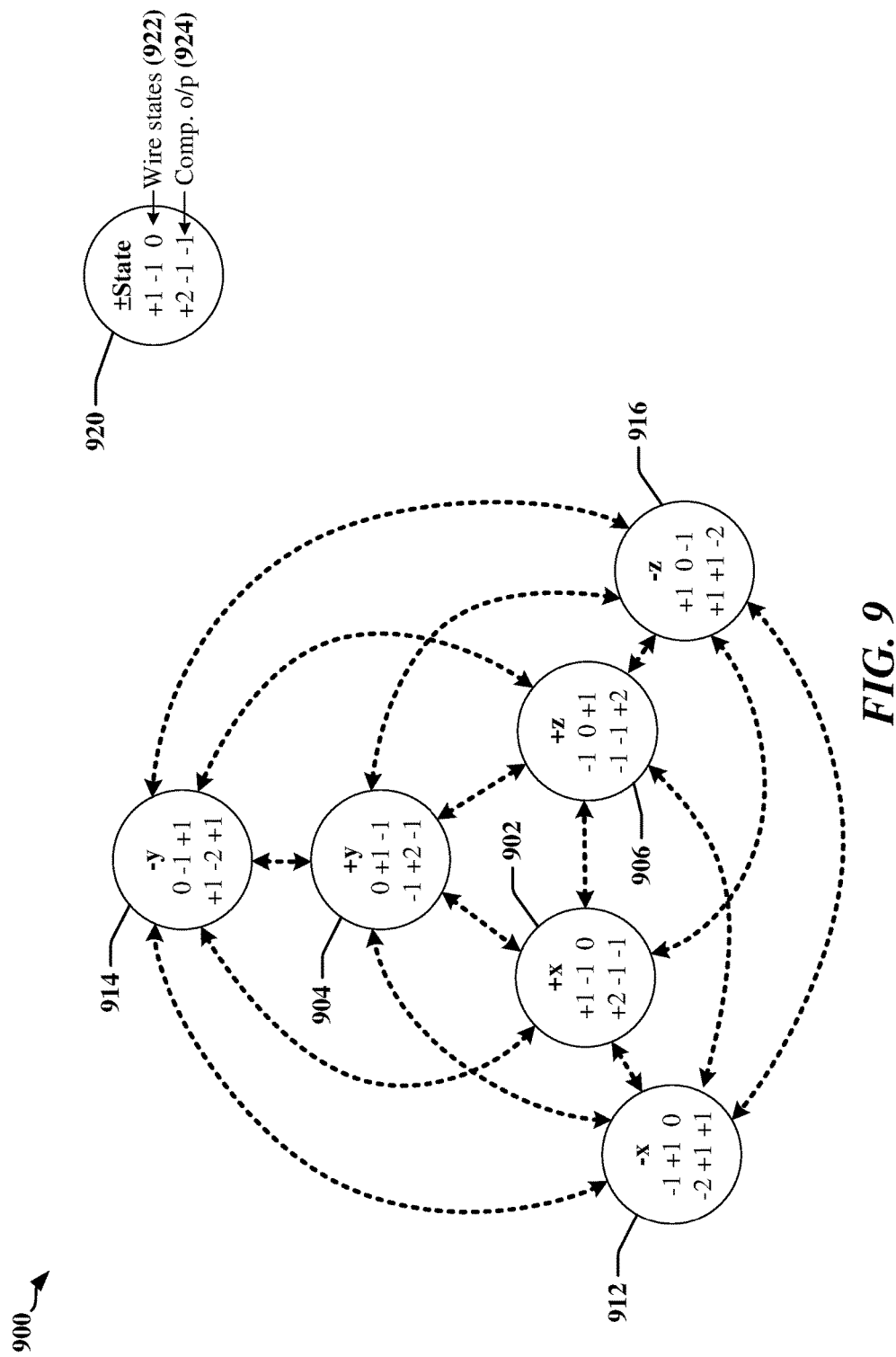
FIG. 9 is a state diagram illustrating potential state transitions in an M-wire N-phase polarity decoder.

FIG. 9 is a state diagram 900 illustrating 6 possible phase-polarity states and 30 possible state transitions in one example of a 3-wire, 3-phase communication link. The possible states 902, 904, 906, 912, 914 and 916 in the state diagram 900 include the states shown in the diagram 450 of FIG. 4. As shown in the example state element 920, each state 902, 904, 906, 912, 914 and 916 in the state diagram 900 includes a field 922 showing the signaling state of signals A, B and C (transmitted on wires 310a, 310b and 310c respectively), and a field 924 showing the result of a subtraction of wire voltages by differential receivers (such as the differential receivers 702a, 702b, 702c depicted in FIG. 7). For example, in state 902 (+x) wire A=+1, wire B=−1 and wire C=0, yielding output of differential receiver 702a (A−B)=+2, differential receiver 702b (B−C)=−1 and differential receiver 702c (C−A)=+1. As illustrated by the state diagram, transition decisions taken by state change detect circuit 704 are based on 5 possible levels produced by differential receivers 702a, 702b and 702c, which include −2, −1, 0, +1 and +2 voltage states.

Figure 10:
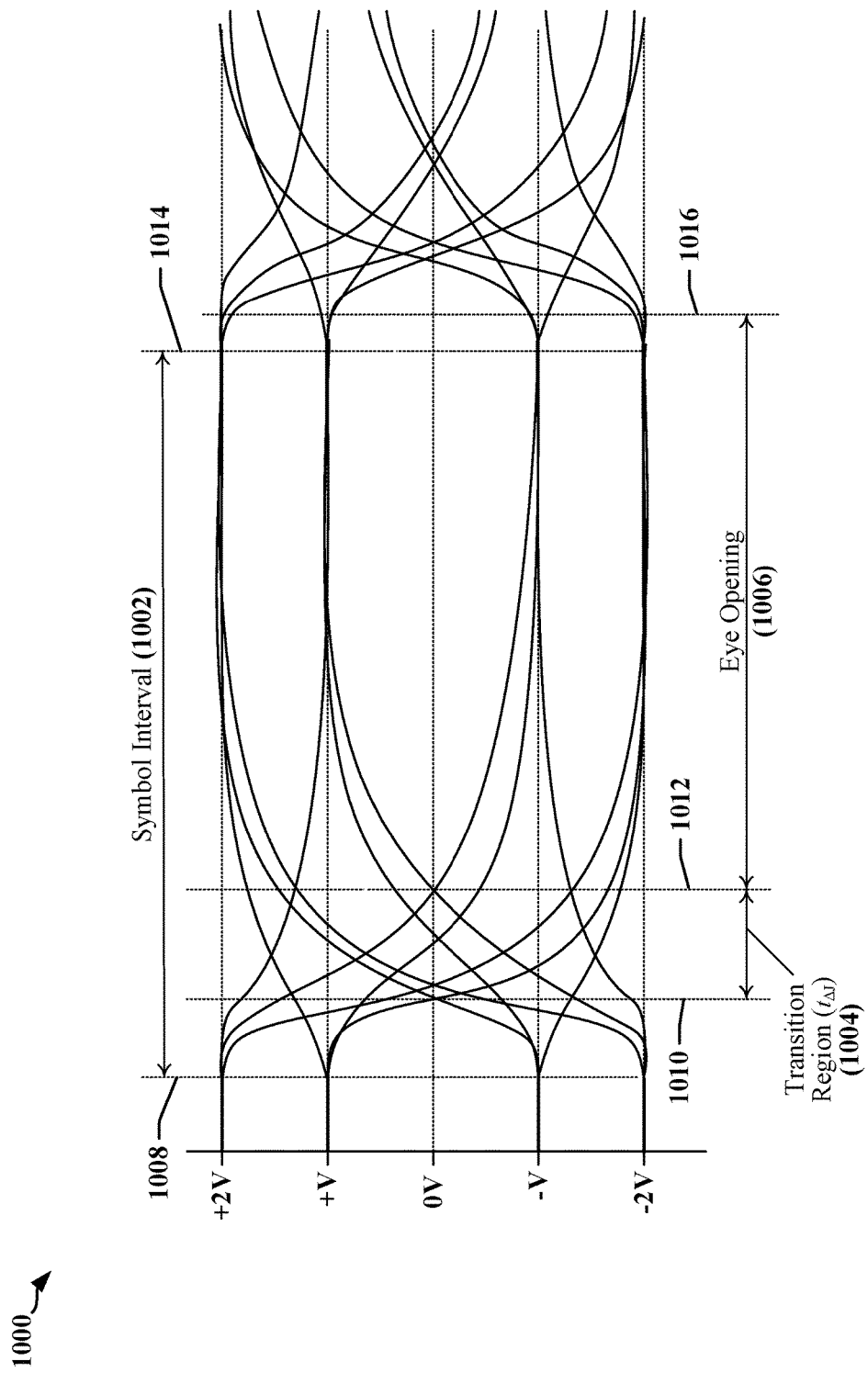
FIG. 10 is a diagram illustrating transition and sampling regions in an M-wire N-phase polarity decoder.

FIG. 10 illustrates an eye diagram 1000 that may be generated from an overlay of multiple symbol intervals 1002. A signal transition region 1004 represents a time period of uncertainty where variable signal rise times prevent reliable decoding. State information may be determined in an "eye opening" 1006 representing the time period in which the symbol is stable and can be reliably received and decoded. In one example, the eye opening 1006 may be determined to begin at the end (i.e., the last zero crossing 1012) of the signal transition region 1004, and end at the boundary 1014 of the symbol interval 1002. In the example depicted in FIG. 10, the eye opening 1006 may be determined to begin at the last zero crossing 1012 marking the end of the signal transition region 1004, and end at the closing edge 1016 of the eye opening 1006, when the signaling state of the wires 310a, 310b, 310c and/or the outputs of the three differential receivers 702a, 702b and 702c have begun to change to reflect the next symbol.

The maximum speed of the communication link 220 configured for N-Phase encoding may be limited by the duration of the signal transition region 1004 compared to the received signal eye opening 1006. The minimum period for the symbol interval 1002 may be constrained by tightened design margins associated with the CDR circuit 514 in the receiver 500 illustrated in FIG. 5, or in the clock generation circuit 706 of FIG. 7, for example. Different signaling state transitions may be associated with different variations in signal transition times corresponding to two or more wires 310a, 310b and/or 310c, thereby causing the outputs of the differential receivers 702a, 702b and 702c in the receiving device to change at different times and/or rates with respect to the symbol boundary 1008, where the inputs to the differential receivers 702a, 702b and 702c begin to change. The large potential differences in received signal transition times between the outputs of multiple differential receivers 702a, 702b and 702c in the receiving device typically requires the implementation of a delay element in the CDR circuit 514. The delay element may have a minimum delay period that exceeds the duration of the transition region 1004. In one example, a delay element may be provided in one or more of the state change detect circuit 704 and/or the clock generation circuit 706 shown in FIG. 7. The maximum delay time provided by this delay element may not extend beyond the closing edge 1016 of the eye opening 1006. In some instances, the maximum delay time provided by the delay element may not extend beyond the commencement of the next symbol interval at the symbol boundary 1014. At faster data rates, the eye opening 1006 can become small in comparison to the symbol interval 1002 and the effect of symbol transition variability may be determinative of the maximum symbol transmission rate.

The duration of any single transition is unlikely to span the full range of the signal transition region ($t_{A}$) 1004, since it is unlikely that a minimum possible signal transition time and a maximum possible transition time occurs during a single symbol transition. In one example, the signal transition region 1004 may be bounded by the time of the first zero crossing 1010 detected at the output of a differential receiver 702a, 702b, or 702c and the time of the last zero crossing 1012 detected at the output of a differential receiver 702a, 702b, or 702c, for all possible symbol transitions. The transition times observed at the outputs of the differential receiver 702a, 702b, and 702c may correspond to the times taken for the connectors and/or wires 310a, 310b or 310c to reach a next state after the input to a driver 308 of the connector and/or wire 310a, 310b or 310c. The longest possible transition time may be determined based on the characteristics of the connector and/or wire 310a, 310b or 310c and the type of state transition involved. In one example, the longest possible transition time may be determined by the rise or fall time of one or more signals. Rise and fall times may be determined by the nature and voltage levels of the original and/or the final states. Typically, the longest possible transition time corresponds to a transition between an actively driven state and an undriven state.

A high value of $t_{A}$ for the transition region 1004 can result in increased design difficulty associated with the CDR circuit 514 or clock generation circuit 706. For example, the clock generation circuit 706 may employ a delay element or timer that is triggered by the first zero crossing of the outputs of the three differential receiver 702a, 702b and 702c. The state of the outputs of all three differential receivers 702a, 702b and 702c may not be safely sampled until all of the differential receivers 702a, 702b and 702c have reached their final state, which may be defined by the eye opening 1006. Accordingly, the timer may preferably expire shortly after the last zero crossing 1012 marking the end of the transition region 1004, at which time clock generation circuit 706 may output a clock edge that is used to sample the outputs of the three differential receivers 702a, 702b and 702c.

In some devices, delay elements in the CDR circuit 514 can be afflicted by variations in manufacturing process, circuit supply voltage, and die temperature (PVT variation), and may generate delays that vary significantly. In such systems, the nominal operating condition of the CDR circuit 514 is generally set by design to generate a clock edge somewhere in the middle of the eye opening 1006 in order to ensure that a clock edge occurs after the last zero crossing 1012, which marks the end of the transition region 1004, and prior to the commencement of the transition region of the next symbol (i.e., the closing edge 1016 of the eye opening 1006), even under worst case PVT effects. Difficulty can arise in designing a CDR circuit 514 that guarantees a clock edge within the eye opening 1006 when the transition region 1004 is large compared to the eye opening 1006. For example, a typical delay element may produce a delay value that changes by a factor of 2 over all PVT conditions, and the eye opening 1006 must be larger than the transition region 1004 in order that a non-adjustable delay value can be chosen.

In some instances, the duration of the transition region 1004 may be calculated based on the maximum timing between a change in input to one or more drivers 308 of a transmitting circuit (see FIG. 3) and corresponding transitions observed or expected at the outputs of the comparators 502 in a receiver (see FIG. 5). In other instances, a modified transition region may be determined at the outputs of the comparators 502 as the maximum difference between the time 1018 of a first transition at the output of one of the comparators 502 and the symbol boundary 1014 measured or observed at the last transition at the output of the other comparators 502, for all symbol transitions.

Signal Transition Adjustment in a C-PHY Interface

According to certain aspects disclosed herein, an encoder may be adapted to minimize the proportion of the symbol interval 1002 occupied by the transition region 1004 and maximize the proportion of the symbol interval 1002 occupied by the eye opening 1006. In one example, the timing of signaling state transitions on one or more wires 310*a*, 310*b* and/or 310*c* (see FIG. 3) may be modified at or prior to the occurrence of a symbol boundary 1008, 1014 for certain symbol transitions. In an encoder (see the encoder 306 in FIG. 3, for example), prior knowledge of the specific N-Phase symbol states 902, 904, 906, 912, 914 or 916 (a priori state knowledge) in consecutive symbols may be used to predict whether the timing of one or more N-Phase driver outputs should be adjusted at the symbol boundary 1008, 1014 between the consecutive symbols. The manner of adjustment may also be determined based on the a priori state knowledge. The adjustments may affect the output of one or more of the drivers 308, and adjustments may be made on a symbol-by-symbol basis. The adjustments may include advancing or delaying certain driver output signal transitions. In some instances, the adjustments may include selective addition of pre-emphasis to certain driver outputs at certain types of symbol transitions, based on prior knowledge of which transition will occur (a priori transition knowledge). As a result, the edges output by the differential receivers 702*a*, 702*b* and 702*c* in the receiving device may be more precisely aligned with respect to time.

The a priori transition knowledge may include information that characterizes the response of connectors to state transitions. Such information may be obtained from models of the connectors and/or wires, drivers and receivers and by simulating the response of the communications links to various types of transitions using the models. In some instances, the a priori transition knowledge may include empirical information obtained from tests performed on physical devices and communication links. The a priori transition knowledge may be calibrated based on differences between simulated and measured results. The a priori transition knowledge may include empirical information provided by a receiver during system operation.

According to certain aspects, smaller variations between transition times on the wires 310*a*, 310*b* and 310*c* and/or at the outputs of the differential receivers 702*a*, 702*b* and 702*c* may provide significantly greater design margins when the proportion of the symbol interval 1002 occupied by the transition region 1004 is minimized. In one example, a CDR circuit 514 may benefit from larger timing tolerances afforded one or more delay elements used in the CDR circuit 514. In another example, the maximum symbol transmission rate of a C-PHY interface may be significantly increased when the proportion of the symbol interval 1002 occupied by the transition region 1004 is minimized and the proportion of the symbol interval 1002 occupied by the eye opening 1006 is maximized.

According to certain aspects described herein, variations of the transition region 1004 may be significantly reduced at the transmitter by considering each symbol transition individually, and by selectively delaying or advancing a transition on one or more signal wire. In some instances, detection circuitry in the transmitter may be adapted to determine anticipated or calculated transition times associated with a symbol transition. In one example, the transmitter may determine whether the duration of transition region 1004 exceeds a predetermined maximum or threshold period. If the transition region 1004 exceeds the maximum or threshold period, then one or more signals may be advanced or delayed to reduce the transition region 1004 at the receiver for the symbol transition. The maximum or threshold period may be determined based on a specified or desired symbol transmission rate, tolerances of the CDR circuit 514 and/or tolerances defined for other circuits in the transmitter or receiver. The maximum or threshold period may be defined to obtain a specified or desired minimum duration of the eye opening 1006. The maximum or threshold period may be defined to minimize jitter in a receive clock derived from the transmitted signals. The transition region 1004 may be significantly reduced when one or more signals may be advanced or delayed.

Figure 11:
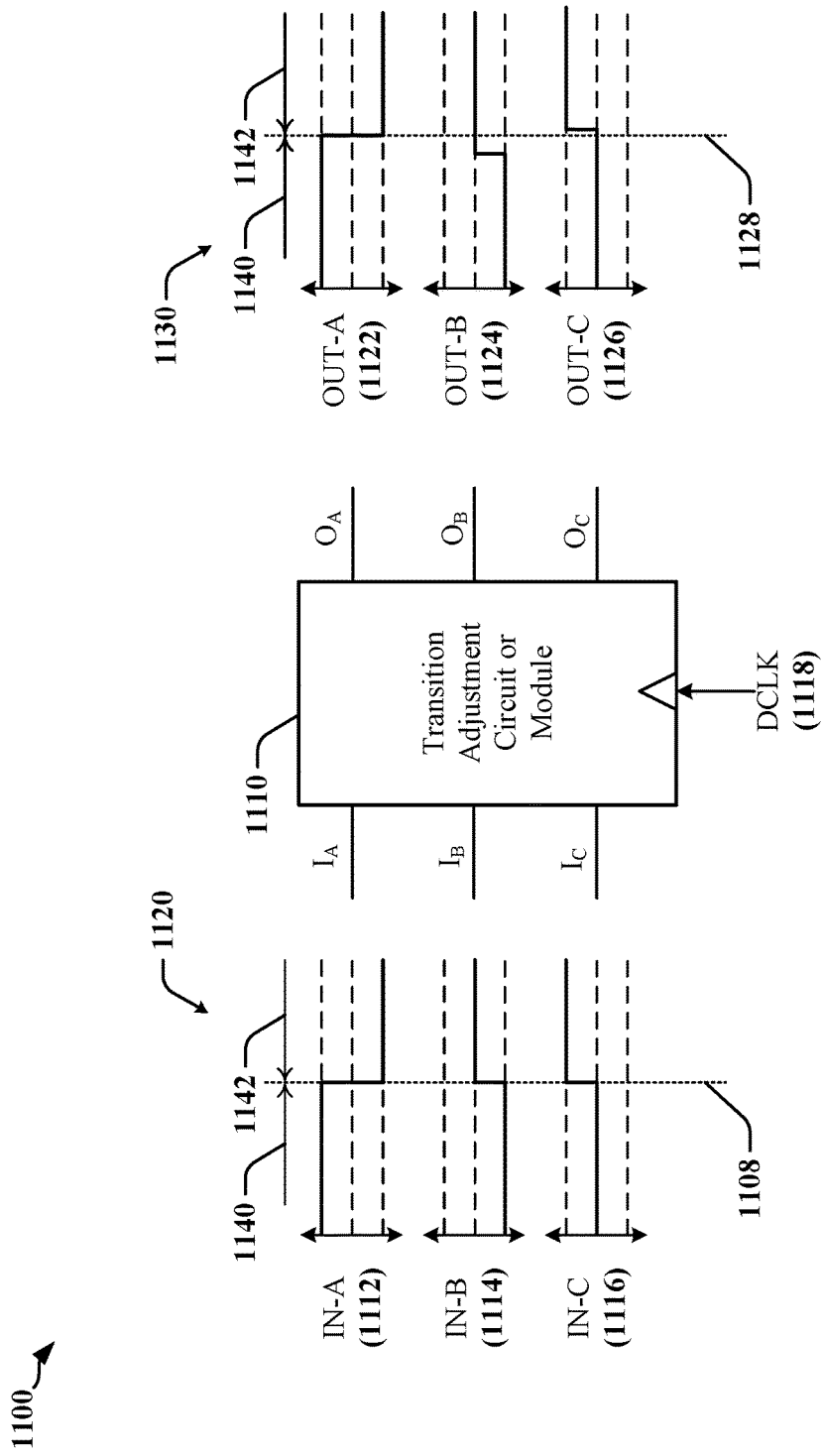
FIG. 11 is a diagram illustrating certain aspects of transition advancement and delay according to certain aspects disclosed herein.

FIG. 11 is a diagram 1100 illustrating signal transition adjustment according to certain aspects disclosed herein. The diagram 1100 relates to signals transmitted over a C-PHY interface, although the concepts described in relation to FIG. 11 apply equally to other multi-wire communications interfaces, including transition-encoding interfaces. A transmitter may include a transition adjustment circuit or module 1110 that may be configured to advance or delay one or more of three signals (IN-A input signal 1112, IN-B input signal 1114, IN-C input signal 1116) to be transmitted over the C-PHY interface. The transition adjustment circuit or module 1110 produces a set of signals for transmission (OUT-A output signal 1122, OUT-B output signal 1124 and OUT-C output signal 1126) that minimize the transition region as perceived by a receiving device. In one example, the transition adjustment circuit or module 1110 may advance or delay one or more input signal 1112, 1114, and/or 1116 in order to cause transition detection signals 710 in a C-PHY decoder to be temporally aligned (see FIG. 7). The signals 710 may be temporally aligned when corresponding edges in the signals 710 occur within a predefined maximum or threshold alignment period. The maximum or threshold alignment period may be determined based on a specified or desired symbol transmission rate, tolerances of the CDR circuit 514 and/or tolerances defined for other circuits in the receiver. The maximum or threshold alignment period may be defined to obtain a specified or desired minimum duration of the eye opening 1006. The maximum or threshold alignment period may be defined to minimize jitter in a receive clock 516.

As shown in the input timing diagram 1120, the input signals 1112, 1114, and/or 1116 input to the transition adjustment circuit or module 1110 include a transition 1108 between two symbol intervals 1140 and 1142. In the first symbol interval 1140, the input signals 1112, 1114, and/or 1116 correspond to a "+x" state 902 having a value of {+1, −1, 0}(see FIG. 9). In the second symbol interval 1142, the input signals 1112, 1114, and/or 1116 correspond to a "+z" state 906 having a value of {−1, 0, +1}. For illustrative purposes only, it may be assumed that transitions between the "0" signaling state and the "+1" or "−1" signaling states are the fastest transitions, while a transition to the "0" signaling state is the slowest transition. In some instances, the relative speeds of transitions between the signaling states may be different.

The transition adjustment circuit or module 1110 may be configured to advance the slowest transitioning signal and/or delay the fastest transitioning signal such that the receiver generates transitions within a shortened transition interval. In this example, the transition adjustment circuit or module 1110 may determine that a transition on the third signal 1116 is likely to produce the fastest transition detection at the receiver, a transition on the second input signal 1114 is likely to produce the slowest transition detection at the receiver, and a transition on the first input signal 1112 is likely to produce neither the fastest nor the slowest transition detection at the receiver. In one example, the transition adjustment circuit or module 1110 may provide output signals 1122, 1124, 1126 which are versions of the three input signals 1112, 1114, and/or 1116 and in which the transition in the second output signal 1124 is advanced with respect to the symbol transition 1128, and the third output signal 1126 is delayed with respect to the symbol transition 1128. In some instances, the transition in the first output signal 1122 may be delayed or advanced such that the transitions on all output signals 1122 1124, 1126 produce transition detections at the receiver that are closely aligned to an edge of a symbol clock. In other instances, at least one of the three output signals 1122, 1124, and/or 1126 is neither delayed nor advanced, and advancements or delays applied to the other output signals 1122, 1124, 1126 are calculated to obtain alignment of transition detections without regard to the symbol clock used by the receiver. That is to say, one or more of the output signals 1122, 1124, 1126 transmitted to the receiver may be advanced and/or delayed with respect to the other output signals 1122, 1124, 1126 such that the edges may be more closely aligned when received by the differential receivers 702a, 702b and 702c.

The decision to advance or retard certain outputs may be based on the states of the raw symbol values before and after the symbol transition.

Signal Transition Adjustment Using Multiple Launch Clocks

Figure 12:
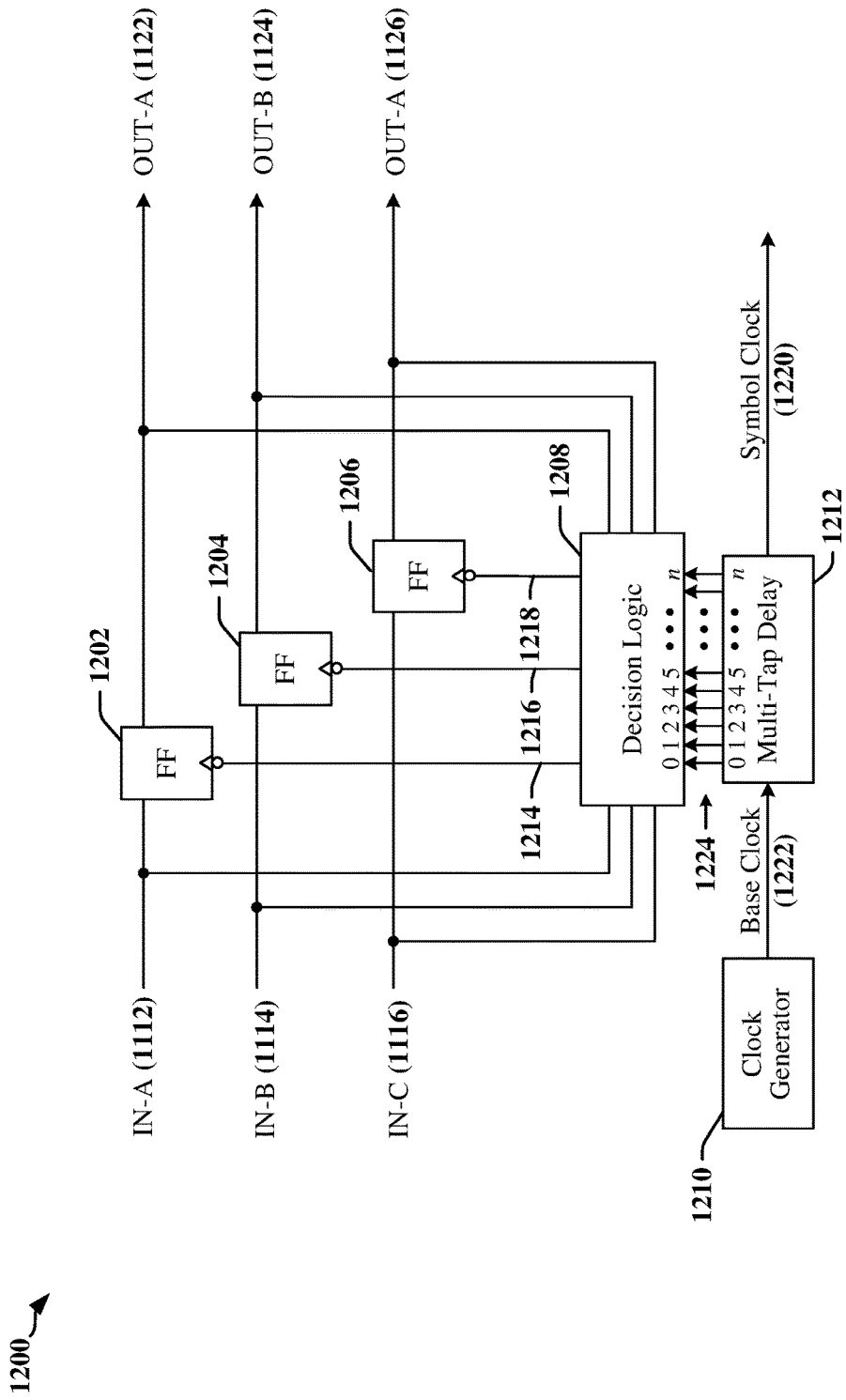
FIG. 12 is a diagram illustrating one example of an advance/delay circuit for signals transmitted on a C-PHY interface according to certain aspects disclosed herein.

FIG. 12 is a block diagram that illustrates certain aspects of a circuit 1200 that may use multiple clock phases to launch symbols and reduce transmitter encoding jitter in a C-PHY interface. The circuit 1200 may correspond to the transition adjustment circuit or module 1110 illustrated in FIG. 11. The circuit 1200 may receive 3-phase input signals 1112, 1114, 1116 to be transmitted in the next symbol transmission interval. The 3-phase input signals 1112, 1114, 1116 may be transmitted when clocked through flip-flops 1202, 1204, 1206, which provide 3-phase output signals 1122, 1124, 1126. In this example, the 3-phase input signals 1112, 1114, 1116 may be represented by first data values, which may be referred to as current data. The output of the flip-flops 1202, 1204, 1206 may be represented by second data values that may be referred to as previous data or delayed data. Each flip-flop 1202, 1204, 1206 is clocked by a different launch signal 1214, 1216, 1218 provided by Decision Logic 1208. Edges in each of the launch signals 1214, 1216, 1218 may be selectively advanced or delayed with respect to edges in other launch signals 1214, 1216, 1218 such that the arrivals of edges in the 3-phase output signals 1122, 1124, 1126 at a receiver are substantially aligned in order to reduce transmitter encoding jitter as perceived by the receiver.

The Decision Logic 1208 receives the 3-phase input signals 1112, 1114, 1116 representing current data and the 3-phase output signals 1122, 1124, 1126 representing previous data. The Decision Logic 1208 may be configured to determine the types of signaling state transitions that will occur on the C-PHY interface when the current data is used to drive the wires of the C-PHY interface. The Decision Logic 1208 may select a clock signal to drive each flip-flop 1202, 1204, 1206 from a plurality of phase-shifted versions of the symbol clock 1220 used to control transmission of symbols on the C-PHY interface. In one example, the plurality of phase-shifted versions of the symbol clock 1220 may be derived from a base clock signal 1222 provided by a clock generator circuit 1210. The base clock signal 1222 may be provided to a multi-tap delay line 1212 that provides phase-shifted signals 1224 that are phase-shifted with respect to the base clock signal 1222. One of the phase-shifted signals 1224 may serve as the symbol clock 1220. The Decision Logic 1208 may be configured to use one or more of the phase-shifted signals 1224 for advancing launch of certain 3-phase signal transitions, and to use one or more other phase-shifted signals 1224 for delaying launch of certain other 3-phase signal transitions.

The Decision Logic 1208 may be adapted to improve the link performance by increasing the horizontal eye opening at the receiver (see FIG. 10). In one example, the Decision Logic 1208 may select between three phase-shifted versions of the symbol clock 1220, where a first version is aligned with the symbol clock 1220, a second version is advanced in time with respect to the first version, and a third version is delayed in time with respect to the first version. The launch signals 1214, 1216, 1218 may be selectively advanced or delayed with respect to one another or with respect to the symbol clock 1220 by selecting one of the three phase-shifted versions of the symbol clock 1220 to control each flip-flop 1202, 1204, 1206.

In another example, the Decision Logic 1208 may receive multiple different versions of the symbol clock 1220 that are advanced in time with respect to the symbol clock 1220, and multiple different versions of the symbol clock 1220 that are delayed in time with respect to the symbol clock 1220. In this example, the Decision Logic 1208 may accommodate variable skews between signals introduced by transmission on the C-PHY interface.

Encoding jitter can be reduced and higher symbol rates can be achieved using selectable launch clocks. Use of different launch clocks can modify timing without altering source impedance of the transmitter and using less power that pre-emphasis circuits and other voltage-mode techniques. The techniques disclosed herein can be scaled in power, based on data rate, and can be used in conjunction with voltage mode techniques.

Figure 13:
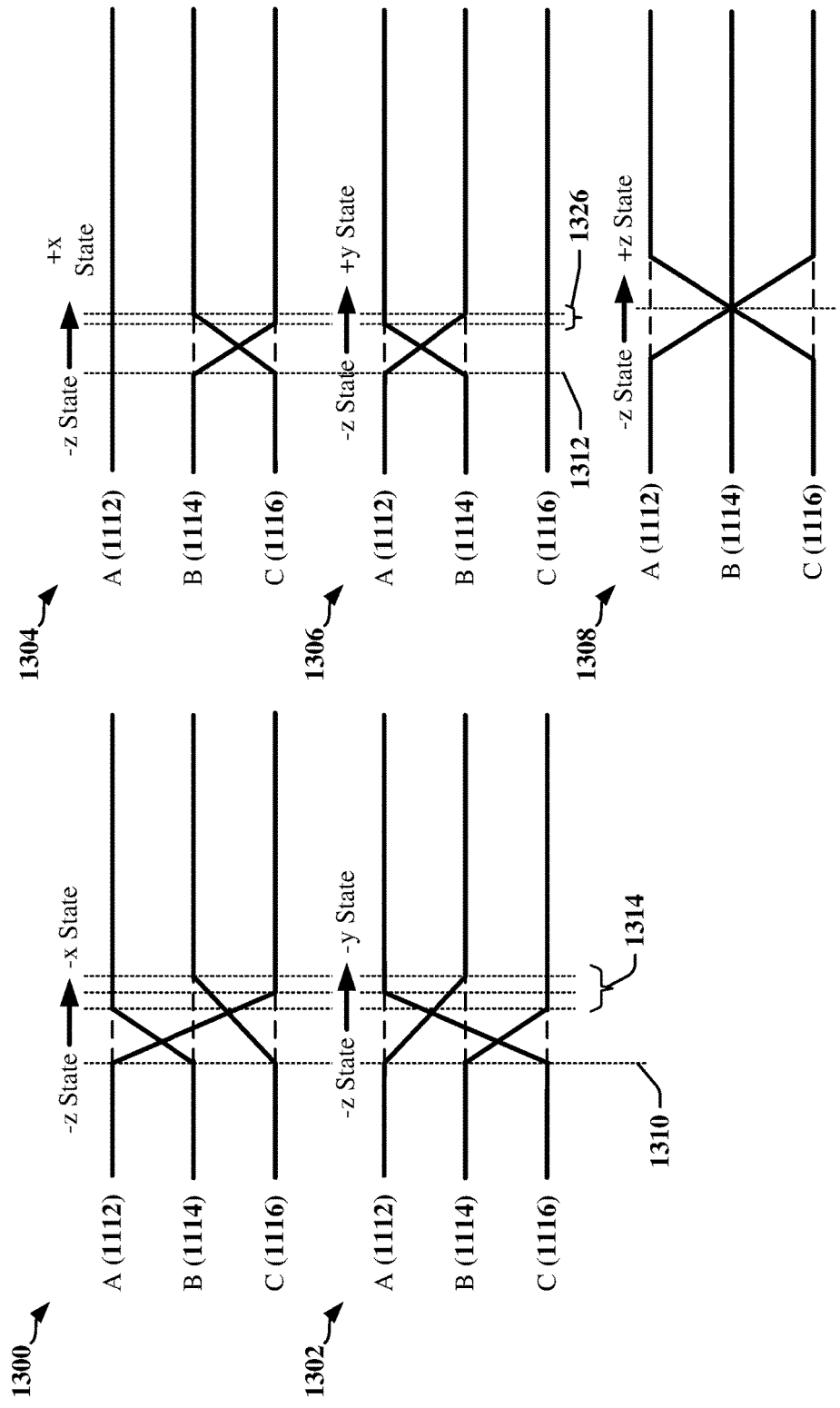
FIG. 13 illustrates an example of the timing associated with C-PHY interface.
Figure 14:
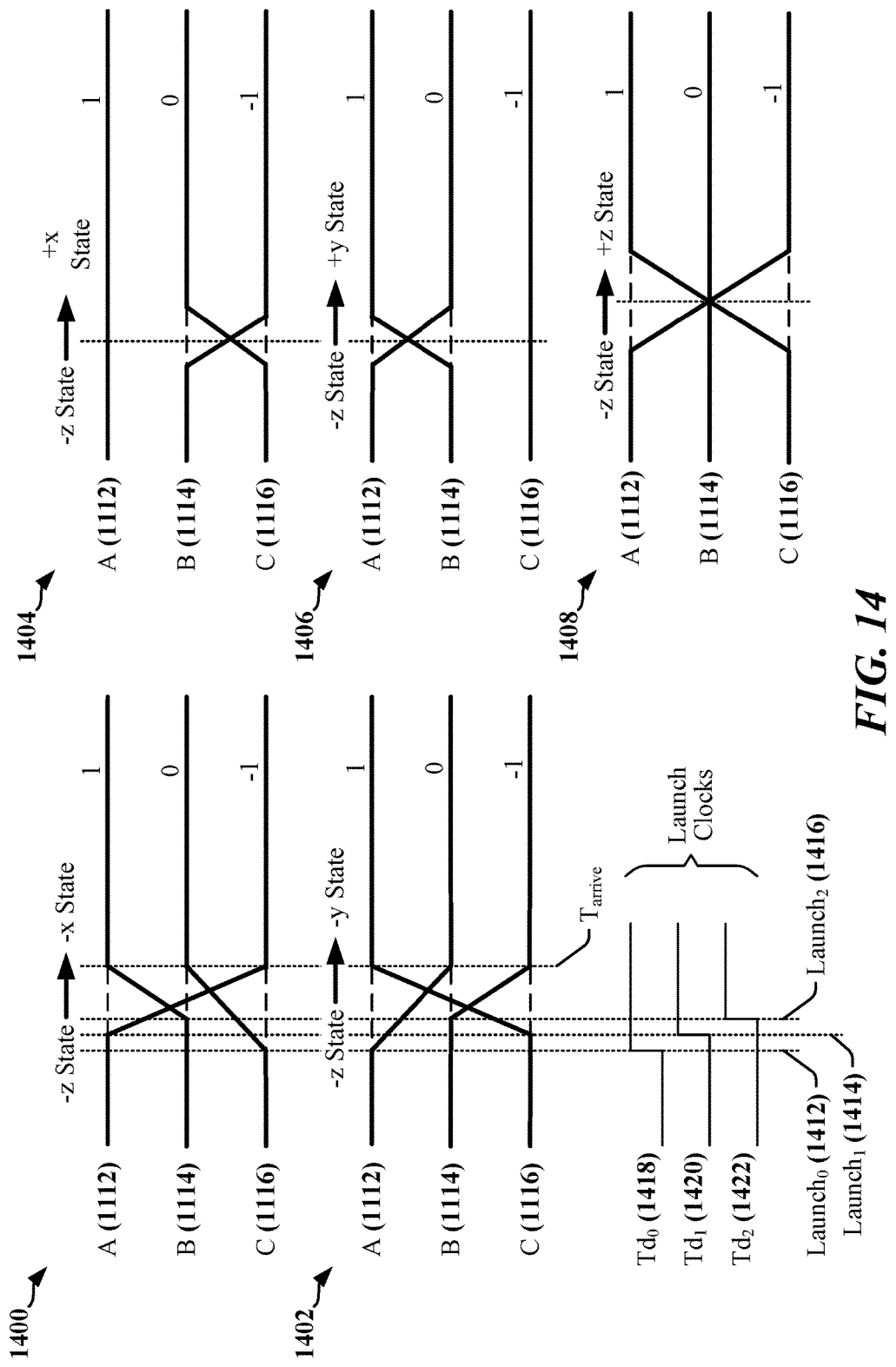
FIG. 14 illustrates an example of timing adjustment associated with an advance/delay circuit provided according to certain aspects disclosed herein.

FIGS. 13 and 14 illustrate timing observed at a receiver coupled to a trio in a C-PHY interface. FIG. 13 illustrates timing of signals without launch timing control, FIG. 14 illustrates timing of signals with launch timing control in accordance with certain aspects disclosed herein. FIGS. 13 and 14 include timing diagrams for each possible transition from the −z state (see FIG. 9). The timing diagrams 1300, 1400 illustrate the transition from the −z state to the −x state, the timing diagrams 1302, 1402 illustrate the transition from the −z state to the −y state, the timing diagrams 1304, 1404 illustrate the transition from the −z state to the +x state, the timing diagrams 1306, 1406 illustrate the transition from the −z state to the +y state, and timing diagrams 1308, 1408 illustrate the transition from the −z state to the +z state.

The three C-PHY signaling states may be represented as {−1, 0, 1}. In the illustrated examples, the 0 state may be an undriven state, and transitions from the 0 state to the +1 state or the −1 state are the fastest transitions, transitions from the between the −1 state and the +1 state are the next fastest state, and the transitions from the +1 state or the −1 state to the 0 state are the slowest transitions. The relative speeds of transition may be different in other implementations. For example, different types of driver or configurations of wiring may affect the difference in transition timing. In FIG. 13, each signal is launched at the same time 1310 or 1312. For transitions between the −z state and the −x state or −y state, three different arrival times 1314 are observed. For other transitions, two arrival times 1326 may be observed.

FIG. 14 illustrates an example 1400, where the Decision Logic 1208 of FIG. 12 operates to adjust timing related to transitions to the the −x and −y states in a C-PHY interface. The Decision Logic 1208 may employ one or more time-based algorithms to reduce transmit encoding jitter. For each symbol to be transmitted, a launch clock signal 1418, 1420, 1422 is selected to launch the 3-phase signal on each wire of the three-wire trio based on the type of transition in signaling state that will occur on the wire when the symbol is transmitted. The launch clock signals 1418, 1420, 1422 may be provided in multiple versions of a symbol clock with different phase shifts. In one example, three clock phases are provided to launch signals in each wire of the three-wire trio. The three clock phases may include: an early launch clock signal 1418 (Td0), a delayed launch clock signal 1420 (Td1) and, an even more delayed clock or late launch clock signal 1422 (Td2). The relative arrival time of these launch clock signals 1418, 1420, 1422 is such that Td0 arrives at a first time 1412, Td1 arrives at a second time 1414, and Td2 arrives at a third time 1416. One of the three launch clock signals 1418, 1420, 1422 is selected to be used to transmit the signal on a corresponding wire based on the state transition being launched. In one example, the algorithm used may be defined as follows:

```
If [the state change involves a change from or to the pull middle level]
  then {
    use Td2 if the [prev_level=pull middle, current level=pull up/pull down], and
    use Td0 if the [prev_level=pull-up/pulldown, current level= pull middle]}
  else {
  use Td1 }.
```

In some examples, the Decision Logic 1208 selects an advanced or a delayed launch clock signal only when the signaling state of all three wires in the C-PHY interface are changing at a boundary between a pair of consecutively transmitted symbols.

In a C-PHY line driver, different circuits may be employed for pulling a wire up to the 1 state, pulling the wire to the middle (0) state, and pulling a wire down to the −1 state. A three-phase input signal 1112, 1114 or 1116 may be represented using multiple bits of data. In one example, a 3-phase signal may be represented by 3 bits that control activation of pull-up, pull-down and pull-middle drivers, where only one bit is set for each symbol transmission interval. In another example, a 3-phase signal may be represented by 2 bits, the value of which indicates a desired state of the corresponding wire (pull-up, pull-down or pull-middle, high-impedance) for a symbol transmission interval.

Figure 15:
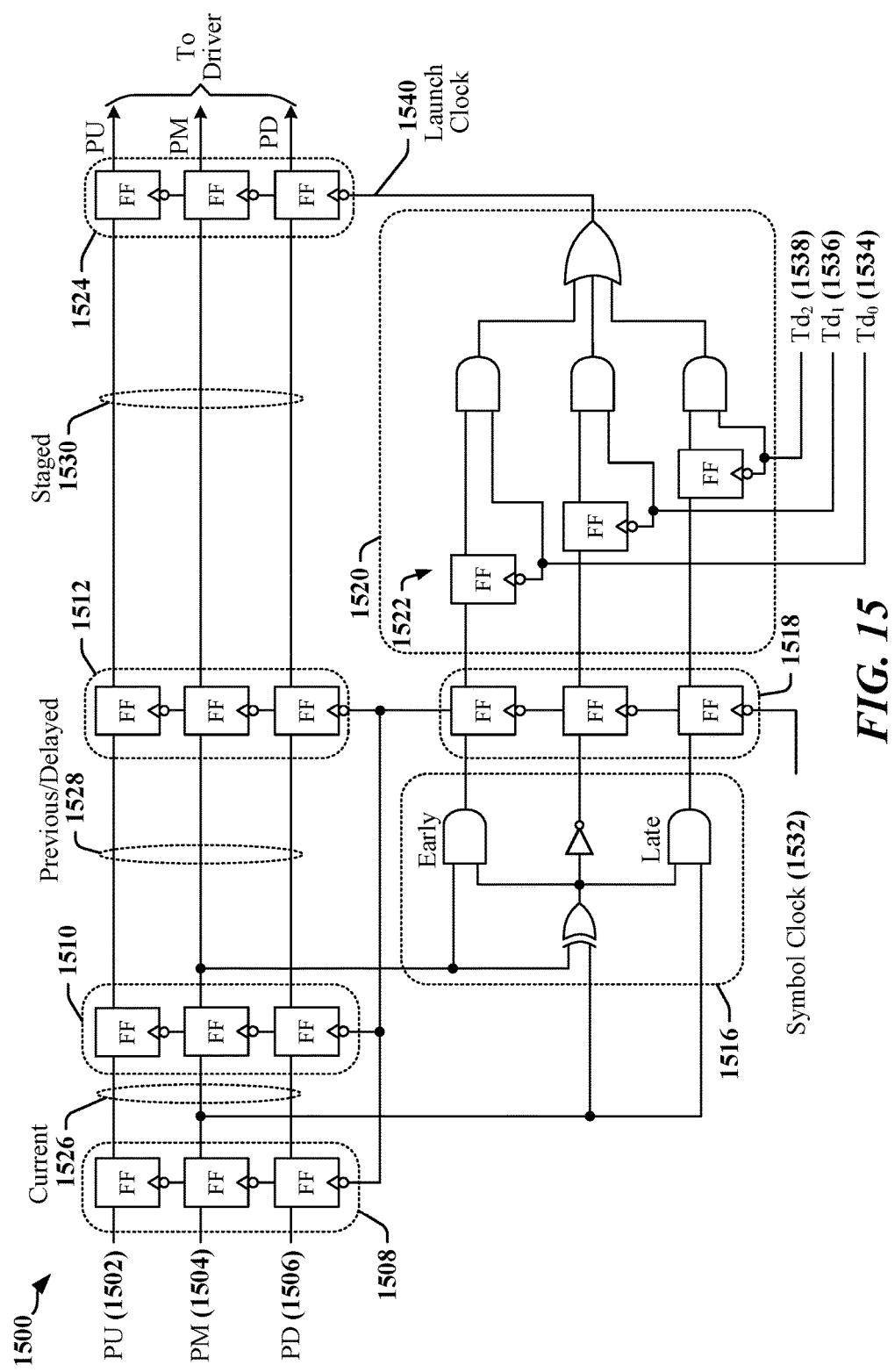
FIG. 15 illustrates an example of a line driver in a transmitter that is adapted to reduce encoding jitter in a C-PHY interface according to certain aspects disclosed herein.

FIG. 15 illustrates one example of a line driver 1500 that may be implemented in a C-PHY transmitter adapted to reduce encoding jitter using multiple clock phases to launch symbols. A first set of flip-flops 1508 receives data representing signaling state of a wire associated with a symbol to be transmitted. The data may include a pull-up bit (PU 1502), a pull-middle bit (PM 1504), and a pull-down bit (PD 1506). The first set of flip-flops 1508 provides current data 1526, which is captured by a second set of flip-flops 1510 in a succeeding symbol interval. The output of the second set of flip-flops 1510 represents the previously transmitted symbol and may be referred to as previous data 1528. The first set of flip-flops 1508 and the second set of flip-flops 1510 may be clocked by the symbol clock 1532 used to control transmission of symbols by the C-PHY transmitter. Certain bits of the current data 1526 and the previous data 1528 provided by the first set of flip-flops 1508 and the second set of flip-flops 1510 are used by decision logic 1516 to select between launch clocks 1534, 1536 and 1538. The decision logic 1516 selects between launch clocks 1534, 1536 and 1538 using clock selection logic 1520.

In the illustrated example, the decision logic 1516 monitors for changes in PM 1504 between symbols. If no change in PM 1504 is observed, the decision logic 1516 causes the clock selection logic 1520 to select the middle phase launch clock 1536 to launch the signal for the current symbol. If a change in PM 1504 is observed, the decision logic 1516 causes the clock selection logic 1520 to select the earlier phase launch clock 1534 or later phase launch clock 1538 based on the signaling state defined for the wire by the current symbol. In one example, the earlier phase launch clock 1534 is selected when the current symbol defines a middle (0) state for the wire. In another example, the later phase launch clock 1538 is selected when the current symbol defines a driven state (+1 or −1) for the wire.

The output of the second set of flip-flops 1510 is clocked through a third set of flip-flops 1512 to provide staged data 1530 that is launched by a fourth set of flip-flops 1524 under the control of a launch clock signal 1540. The third set of flip-flops 1512 matches timing of the data path with the clock generation path which includes two sets of flip-flops 1518 and 1522.

Some pairs of consecutively transmitted symbols produce substantially symmetric transitions on two wires while the wire remains in the same state through a boundary between these pairs of consecutively transmitted symbols (see timing diagrams 1304, 1306 and 1308 in FIG. 13, for example). When two wires effectively swap signaling state, advancement or retardation of signal launch may not be required. In some examples, the drive the "un-driven" output may be momentarily driven with a high drive-strength to quickly achieve the necessary transition, before reducing or completely disabling the "un-driven" signal driver after the transition is complete and/or the round-trip time over the wire to the receiver has expired. In these latter examples, the transition times from driven state to undriven state and from undriven state to driven state may be substantially the same, and/or differences in transition times may be negligible. In some implementations, the decision logic 1516 may select an advanced or a delayed launch clock only when the signaling state of all three wires in the C-PHY interface are changing at a boundary between a pair of consecutively transmitted symbols. In such instances, edges in the signals transmitted on each of the three wires in the C-PHY interface are launched using a common launch clock, or the symbol clock 1532. In other implementations, it may be desirable to use a different launch clock for a signal transitioning from the driven state to the undriven state than the launch clock used for a signal transitioning from undriven state to driven state.

Figure 16:
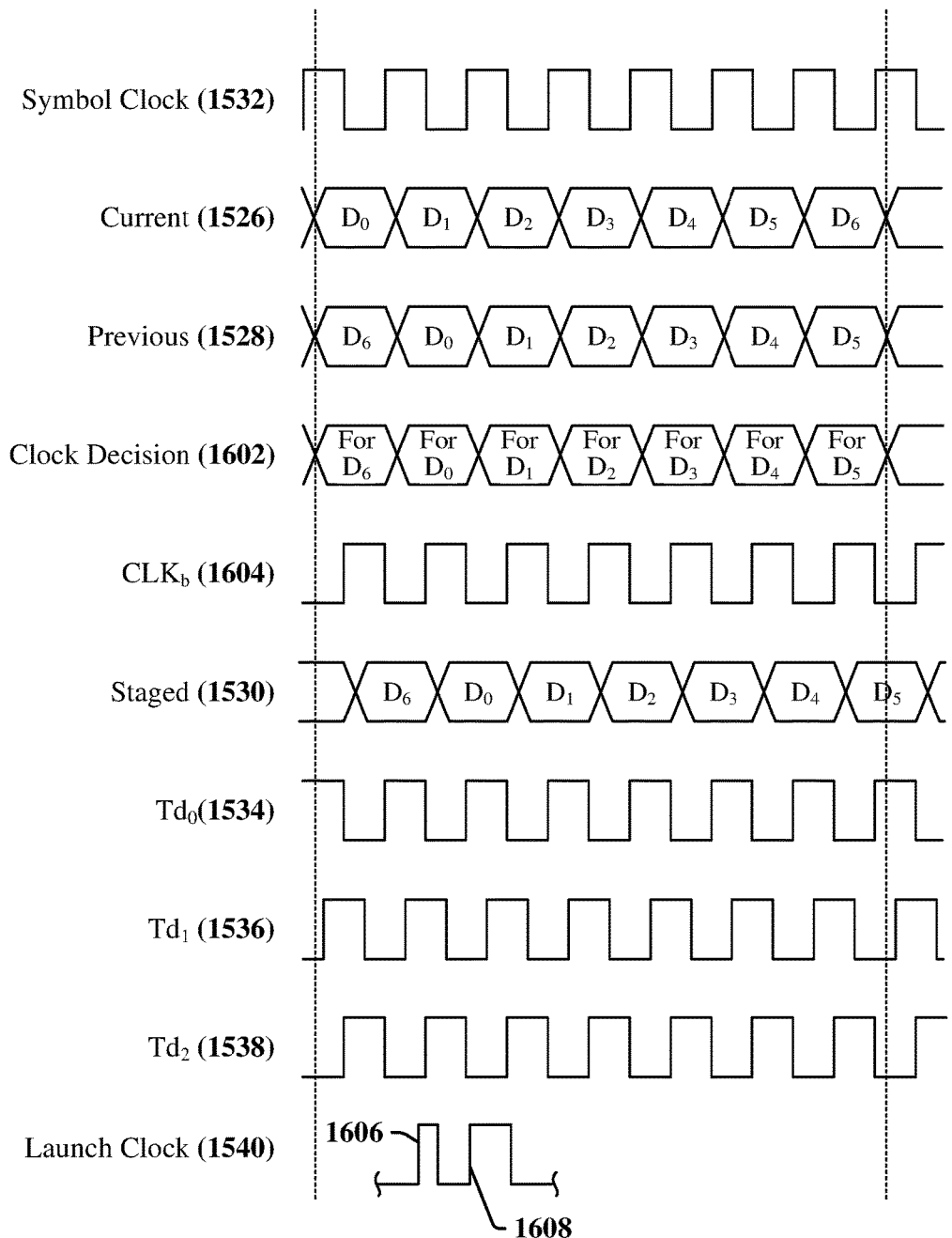
FIG. 16 is a timing diagram that illustrates the operation of the line driver illustrated in FIG. 15.

FIG. 16 is a timing diagram that illustrates the operation of the line driver 1500 of FIG. 15. The symbol clock 1532 may be generated as one of a plurality of phase-shifted clocks. In one example, the symbol clock 1532 may have the same phase shift as the middle phase launch clock 1536. In some instances, the symbol clock 1532 may have a phase shift with respect to the middle phase launch clock 1536. The decision logic 1516 may arrive at decisions 1602 when consecutive pairs of symbols are available. In the example, timing of the clock edge 1606 for data $D_0$ is delayed with respect to the symbol clock 1532, and timing of the clock edge 1608 for data $D_1$ is advanced with respect to the symbol clock 1532.

Examples of Processing Circuits and Methods

Figure 17:
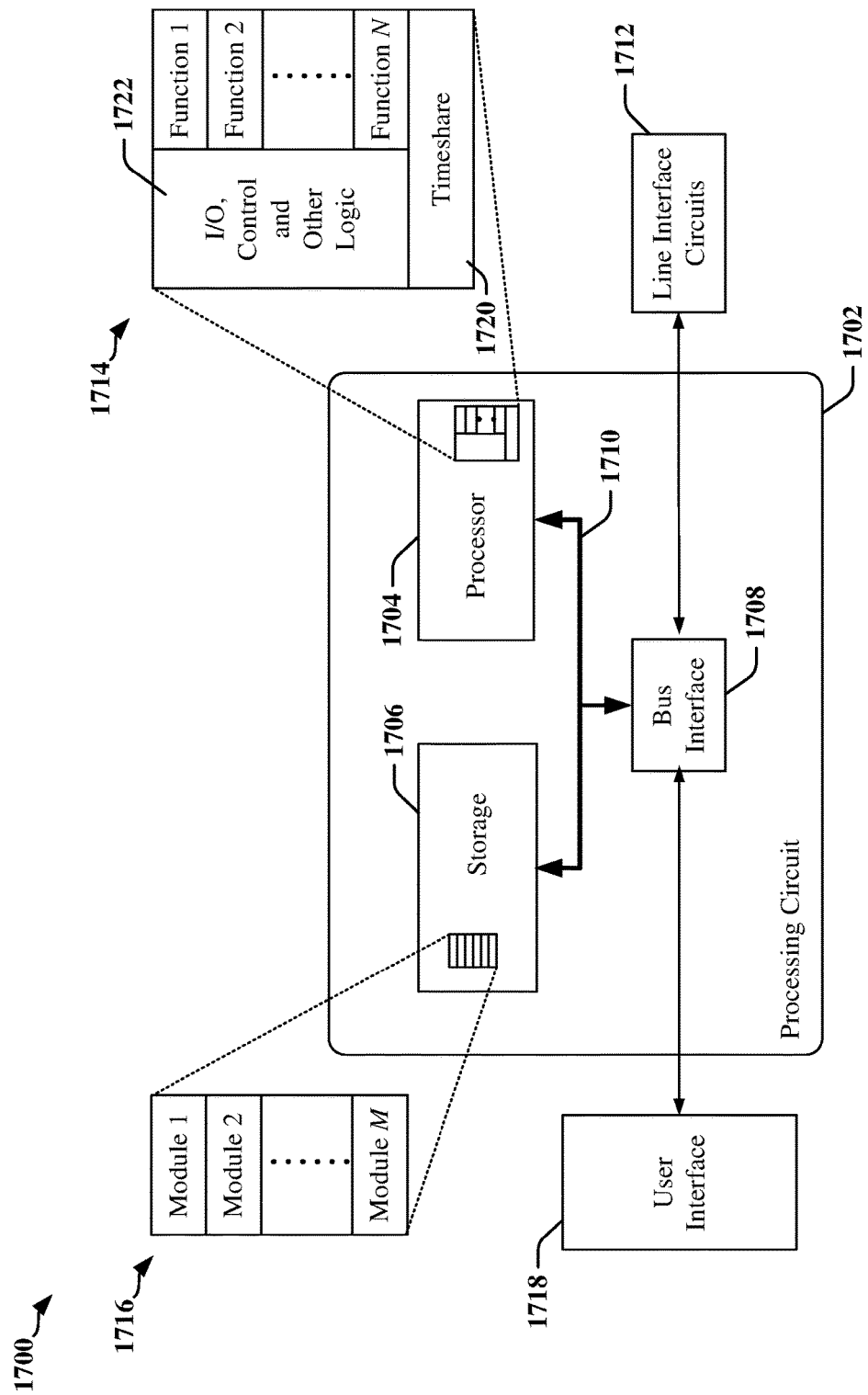
FIG. 17 is a block diagram illustrating an example of an apparatus employing a processing system that may be adapted according to certain aspects disclosed herein.

FIG. 17 is a conceptual diagram 1700 illustrating an example of a hardware implementation for an apparatus employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include one or more processors 1704 that are controlled by some combination of hardware and software modules. Examples of processors 1704 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712. A transceiver 1712 may be provided for each networking technology supported by the processing circuit. In some instances, multiple networking technologies may share some or all of the circuitry or processing modules found in a transceiver 1712. Each transceiver 1712 provides a means for communicating with various other apparatus over a transmission medium. Depending upon the nature of the apparatus, a user interface 1718 (e.g., keypad, display, touch interface, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
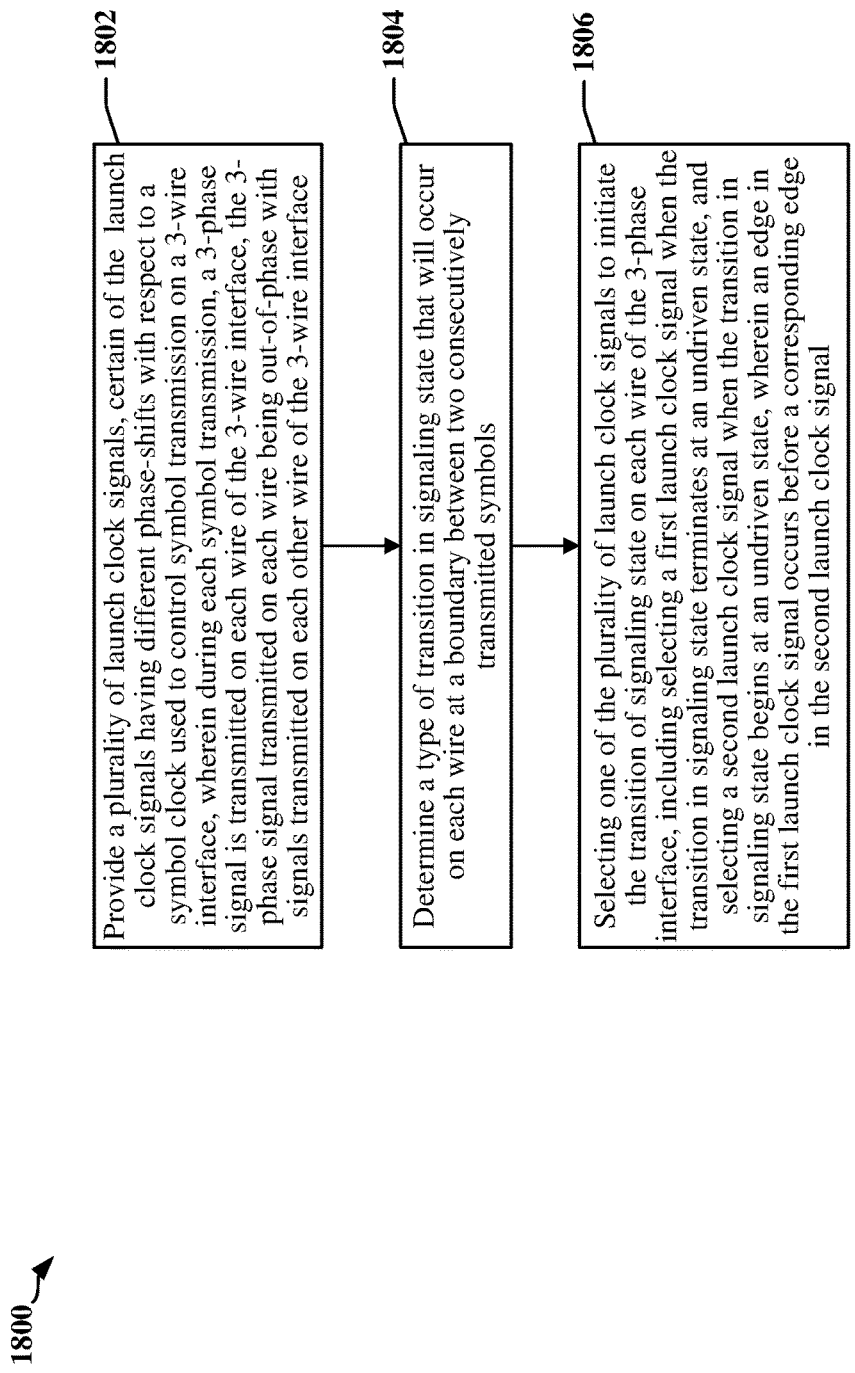
FIG. 18 is a flow chart of a data communications method that may be employed at a transmitter in accordance with certain aspects disclosed herein.

FIG. 18 is a flowchart illustrating a method for data communications on a 3-wire communications interface. The 3-wire interface complies or is compatible with a C-PHY interface defined by MIPI Alliance. The method may be performed using a transmitting circuit.

At block 1802, the transmitting circuit may provide a plurality of launch clock signals. Certain of the launch clock signals having a different phase-shift with respect to a symbol clock used to control symbol transmission on a 3-wire interface. During each symbol transmission, a 3-phase signal may be transmitted on each wire of the 3-wire interface. The 3-phase signal transmitted on each wire may be out-of-phase with signals transmitted on each of the other wires of the 3-wire interface.

At block 1804, the transmitting circuit may determine a type of transition in signaling state that will occur on each wire of the 3-wire interface at a boundary between two consecutively transmitted symbols.

At block 1806, the transmitting circuit may select one of the plurality of launch clock signals to initiate the transition of signaling state on each wire of the 3-phase interface. The transmitting circuit may select a first launch clock signal when the transition in signaling state terminates at an undriven state. The transmitting circuit may select a second launch clock signal when the transition in signaling state begins at an undriven state. In one example, an edge in the first launch clock signal occurs before a corresponding edge in the second launch clock signal.

In some examples, the transmitting circuit may select a common launch clock signal for all wires of the 3-wire interface when less than all wires of the 3-wire interface transition at the boundary between the two consecutively transmitted symbols.

In some instances, the transmitting circuit may select a third launch clock signal when the transition in signaling state begins and ends at different driven states. In one example, an edge in the third launch clock signal occurs after a corresponding edge in the first launch clock signal and before a corresponding edge in the second launch clock signal. The first launch clock signal, the second launch clock signal, and the third launch clock signal may be selected to reduce differences between arrival times of signaling state transitions associated with the boundary between the two consecutively transmitted symbols at a receiver coupled to the 3-wire interface. The third launch clock may be the symbol clock. The third launch clock and the symbol clock may have the same phase shift.

In one example, a transition occurs on at least one wire of the 3-wire interface at each boundary between pairs of consecutively transmitted symbols.

Figure 19:
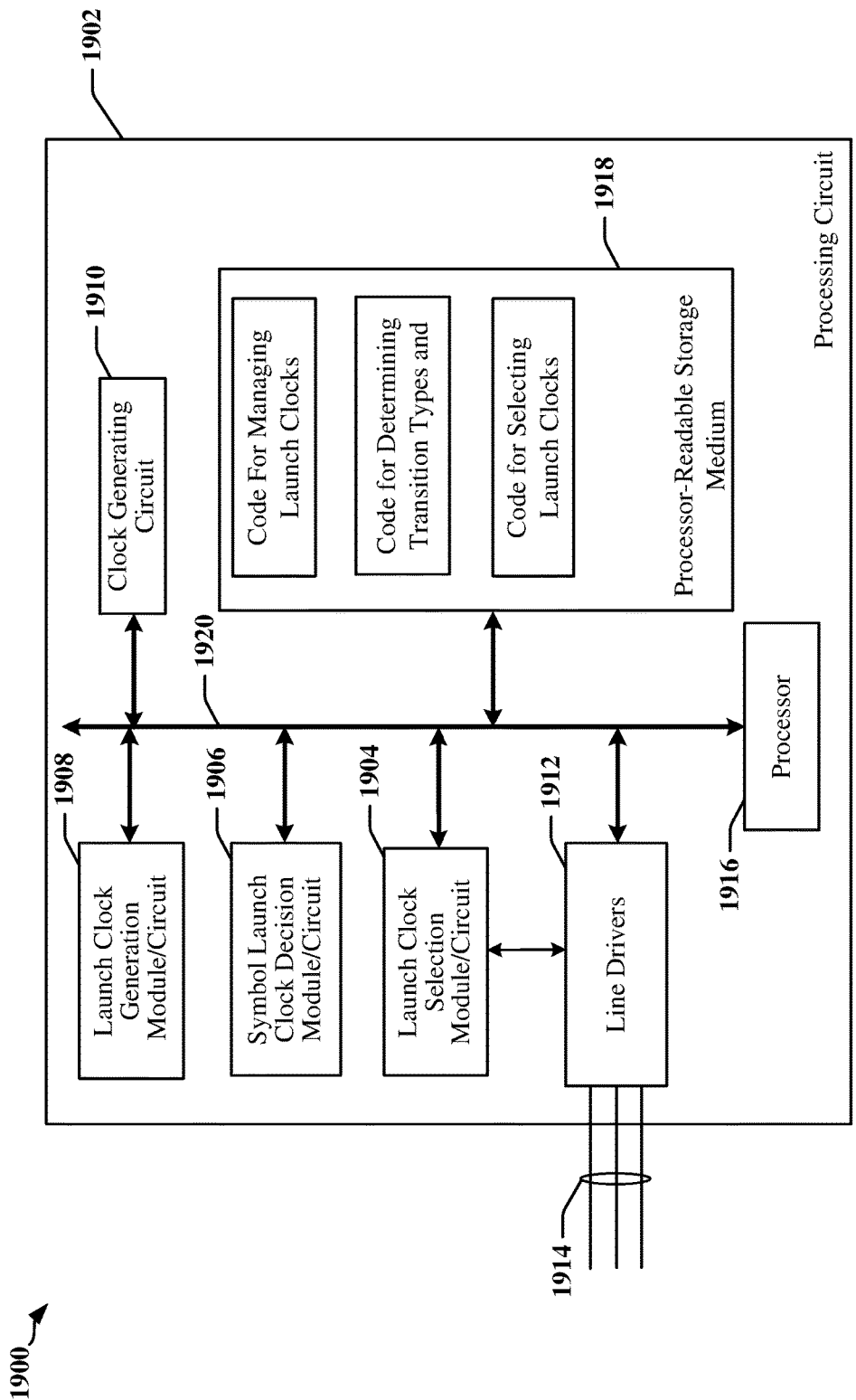
FIG. 19 is a diagram illustrating a first example of a hardware implementation for an apparatus used in an interface that provides symbol error detection according to certain aspects disclosed herein.

FIG. 19 is a conceptual diagram illustrating an example of a hardware implementation for an apparatus 1900 employing a processing circuit 1902. In this example, the processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors, represented generally by the processor 1916, and computer-readable media, represented generally by the processor-readable storage medium 1918, the modules or circuits 1904, 1906, and 1908, clock generating circuit 1910, line drivers 1912 coupled to the connectors or wires 1914 of the 3-wire bus and the processor-readable storage medium 1918. The bus 1920 may also link various other circuits such as timing sources, timers, peripherals, voltage regulators, and power management circuits. One or more additional clock generation circuits may be provided within the processing circuit 1902 or controlled by the processing circuit 1902 and/or one or more processors 1916. In one example, the clock generation circuits may include one or more crystal oscillators, one or more phase-locked loop devices, and/or one or more configurable clock trees. The clock generating circuits 1910 may include or be coupled to a multi-tap delay line.

The processor 1916 is responsible for managing the bus 1920 and general processing, including the execution of software stored on the processor-readable storage medium 1918. The software, when executed by the processor 1916, causes the processing circuit 1902 to perform the various functions described supra for any particular apparatus. The processor-readable storage medium 1918 may be used for storing data that is manipulated by the processor 1916 when executing software.

In one configuration, the processing circuit 1902 may include one or more modules and/or circuits 1908, 1910 configured to provide a plurality of launch clock signals, each launch clock signal having a different phase-shifts with respect to a symbol clock used to control symbol transmission on a 3-wire interface. The processing circuit 1902 may include one or more modules and/or circuits 1906 configured to determine a type of transition in signaling state that will occur on each wire at a boundary between two consecutively transmitted symbols. The processing circuit 1902 may include one or more modules and/or circuits 1904, 1912 configured to initiate the transition of signaling state using one of the plurality of launch clock signals. For example, the modules and/or circuits 1904, 1912 may be configured to use a first launch clock signal to initiate the transition of signaling state when the transition in signaling state terminates at an undriven state, and use a second launch clock signal to initiate the transition of signaling state when the transition in signaling state begins at an undriven state. An edge in the first launch clock signal may occur before a corresponding edge in the second launch clock signal, for example.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method of transmitting data on a multi-wire interface, comprising:
   providing a plurality of launch clock signals, each of the launch clock signals having a different phase-shift with respect to a symbol clock used to control symbol transmission on a 3-wire interface, wherein during each symbol transmission, a 3-phase signal is transmitted on each wire of the 3-wire interface, the 3-phase signal transmitted on each wire being out-of-phase with signals transmitted on each other wire of the 3-wire interface;
   determining a type of transition in signaling state that will occur on each wire of the 3-wire interface at a boundary between two consecutively transmitted symbols;
   selecting one of the plurality of launch clock signals to initiate the transition in signaling state on each wire of the 3-wire interface, wherein selecting one of the plurality of launch clock signals includes:
     selecting a first launch clock signal when the transition in signaling state terminates at an undriven state,
     selecting a second launch clock signal when the transition in signaling state begins at an undriven state,
     selecting a third launch clock signal when the transition in signaling state begins and ends at different driven states, wherein an edge in the third launch clock signal occurs after a corresponding edge in the first launch clock signal and before a corresponding edge in the second launch clock signal, and
     selecting a common launch clock signal to initiate the transition in signaling state on all wires of the 3-wire interface when less than all wires of the 3-wire interface transition at the boundary between the two consecutively transmitted symbols; and
   using the selected one of the plurality of launches the transition signals to control a flip-flop that launches the transition in signaling state on each wire of the 3-wire interface,
   wherein an edge in the first launch clock signal occurs before a corresponding edge in the second launch clock signal.

2. The method of claim 1, wherein the first launch clock signal, the second launch clock signal, and the third launch clock signal are selected to reduce differences between arrival times of signaling state transitions associated with the boundary between the two consecutively transmitted symbols at a receiver coupled to the 3-wire interface.

3. The method of claim 1, wherein the third launch clock signal is the symbol clock.

4. The method of claim 1, wherein a transition occurs on at least one wire of the 3-wire interface at each boundary between pairs of consecutively transmitted symbols.

5. The method of claim 1, wherein the 3-wire interface complies with, or is compatible with a C-PHY interface defined by the Mobile Industry Processor Interface Alliance.

6. A line driver circuit coupled to one wire of a 3-wire interface, comprising:
   a clock generator configured to provide a plurality of launch clock signals, each launch clock signal having a different phase-shift with respect to a symbol clock used to control symbol transmission on the 3-wire interface;
   decision logic configured to:
     determine a type of transition in signaling state that will occur on each wire of the 3-wire interface at a boundary between two consecutively transmitted symbols, and
     select one of the plurality of launch clock signals as a current launch signal to initiate the transition in signaling state,
     wherein the decision logic selects a first launch clock signal when the transition in signaling state terminates at an undriven state, selects a second launch clock signal when the transition in signaling state begins at an undriven state, selects a third launch clock signal when the transition in signaling state begins and ends at different driven states, and selects a common launch clock signal to initiate the transition in signaling state on all wires of the 3-wire interface when less than all wires of the 3-wire interface transition at the boundary between the two consecutively transmitted symbols, wherein an edge in the first launch clock signal occurs before a corresponding edge in the second launch clock signal, and wherein an edge in the third launch clock signal occurs after a corresponding edge in the first launch clock signal and before a corresponding edge in the second launch clock signal; and
   a set of flip-flops configured to receive the current launch signal as a clock signal that controls timing of launch of 3-phase signals on the 3-wire interface, wherein during each symbol transmission, a 3-phase signal output by a corresponding flip-flop is transmitted on each wire of the 3-wire interface, the 3-phase signal transmitted on each wire being out-of-phase with signals transmitted on each other wire of the 3-wire interface.

7. The line driver circuit of claim 6, wherein the first launch clock signal, the second launch clock signal, and the third launch clock signal are selected to reduce differences between arrival times of signaling state transitions associated with the boundary between the two consecutively transmitted symbols at a receiver coupled to the 3-wire interface.

8. The line driver circuit of claim 6, wherein the third launch clock signal is the symbol clock.

9. The line driver circuit of claim 6, wherein a transition occurs on at least one wire of the 3-wire interface at each boundary between pairs of consecutively transmitted symbols.

10. The line driver circuit of claim 6, wherein the 3-wire interface complies with, or is compatible with a C-PHY interface defined by the Mobile Industry Processor Interface Alliance.

11. An apparatus comprising:
means for providing a plurality of launch clock signals, each launch clock signal having a different phase-shift with respect to a symbol clock used to control symbol transmission on a 3-wire interface, wherein during each symbol transmission, a 3-phase signal is transmitted on each wire of the 3-wire interface, the 3-phase signal transmitted on each wire being out-of-phase with signals transmitted on each other wire of the 3-wire interface;
means for determining a type of transition in signaling state that will occur on each wire at a boundary between two consecutively transmitted symbols; and
means for initiating the transition in signaling state using one of the plurality of launch clock signals, wherein the means for initiating the transition in signaling state is configured to:
use a first launch clock signal to initiate the transition in signaling state when the transition in signaling state terminates at an undriven state;
use a second launch clock signal to initiate the transition in signaling state when the transition in signaling state begins at an undriven state;
use a third launch clock signal when the transition in signaling state begins and ends at different driven states, wherein an edge in the third launch clock signal occurs after a corresponding edge in the first launch clock signal and before a corresponding edge in the second launch clock signal, and
use a common launch clock signal to initiate the transition in signaling state on all wires of the 3-wire interface when less than all wires of the 3-wire interface transition at the boundary between the two consecutively transmitted symbols; and
use the one of the plurality of launch clock signals to control a flip-flop that launches the transition in signaling state on each wire of the 3-wire interface,
wherein an edge in the first launch clock signal occurs before a corresponding edge in the second launch clock signal.

12. The apparatus of claim 11, wherein the first launch clock signal, the second launch clock signal, and the third launch clock signal are selected to reduce differences between arrival times of signaling state transitions associated with the boundary between the two consecutively transmitted symbols at a receiver coupled to the 3-wire interface.

13. The apparatus of claim 11, wherein the third launch clock signal is the symbol clock.

14. The apparatus of claim 11, wherein a transition occurs on at least one wire of the 3-wire interface at each boundary between pairs of consecutively transmitted symbols.

15. The apparatus of claim 11, wherein the 3-wire interface complies with, or is compatible with a C-PHY interface defined by the Mobile Industry Processor Interface Alliance.

16. A non-transitory processor-readable storage medium, comprising code for:
providing a plurality of launch clock signals, each launch clock signal having a different phase-shift with respect to a symbol clock used to control symbol transmission on a 3-wire interface, wherein during each symbol transmission, a 3-phase signal is transmitted on each wire of the 3-wire interface, the 3-phase signal transmitted on each wire being out-of-phase with signals transmitted on each other wire of the 3-wire interface;
determining a type of transition in signaling state that will occur on each wire of the 3-wire interface at a boundary between two consecutively transmitted symbols;
selecting one of the plurality of launch clock signals to initiate the transition in signaling state on each wire of the 3-wire interface, wherein the code for selecting one of the plurality of launch clock signals includes code for:
selecting a first launch clock signal when the transition in signaling state terminates at an undriven state,
selecting a second launch clock signal when the transition in signaling state begins at an undriven state,
selecting a third launch clock signal when the transition in signaling state begins and ends at different driven states, wherein an edge in the third launch clock signal occurs after a corresponding edge in the first launch clock signal and before a corresponding edge in the second launch clock signal, and
selecting a common launch clock signal to initiate the transition of signaling state on all wires of the 3-wire interface when less than all wires of the 3-wire interface transition at the boundary between the two consecutively transmitted symbols; and
using the selected one of the plurality of launch clock signals to control a flip-flop that launches the transition in signaling state on each wire of the 3-wire interface,
wherein an edge in the first launch clock signal occurs before a corresponding edge in the second launch clock signal.

17. The storage medium of claim 16, wherein the first launch clock signal, the second launch clock signal, and the third launch clock signal are selected to reduce differences between arrival times of signaling state transitions associated with the boundary between the two consecutively transmitted symbols at a receiver coupled to the 3-wire interface.

18. The storage medium of claim 16, wherein the third launch clock signal is the symbol clock.

19. The storage medium of claim 16, wherein a transition occurs on at least one wire of the 3-wire interface at each boundary between pairs of consecutively transmitted symbols.

20. The storage medium of claim 16, wherein the 3-wire interface complies with, or is compatible with a C-PHY interface defined by the Mobile Industry Processor Interface Alliance.

* * * * *

UNITED STATES PATENT AND TRADEMARK OFFICE
CERTIFICATE OF CORRECTION

| | |
|---|---|
| PATENT NO. | : 10,289,600 B2 |
| APPLICATION NO. | : 15/332756 |
| DATED | : May 14, 2019 |
| INVENTOR(S) | : Sejpal et al. |

It is certified that error appears in the above-identified patent and that said Letters Patent is hereby corrected as shown below:

In the Claims

Column 27, Line 61, the term "using the selected one of the plurality of launches the transition signals" is replaced with "using the selected one of the plurality of launch clock signals".

Column 29, Line 37, the term "the second launch clock signal, and" is replaced with "the second launch clock signal,".

Signed and Sealed this
Fourth Day of May, 2021

Drew Hirshfeld
*Performing the Functions and Duties of the
Under Secretary of Commerce for Intellectual Property and
Director of the United States Patent and Trademark Office*